United States Patent
Sypniewski et al.

(10) Patent No.: US 10,720,151 B2
(45) Date of Patent: Jul. 21, 2020

(54) END-TO-END NEURAL NETWORKS FOR SPEECH RECOGNITION AND CLASSIFICATION

(71) Applicant: Deepgram, Inc., San Francisco, CA (US)

(72) Inventors: Adam Sypniewski, Ypsilanti, MI (US); Jeff Ward, San Francisco, CA (US); Scott Stephenson, San Francisco, CA (US)

(73) Assignee: Deepgram, Inc., San Francisco, CA (US)

( * ) Notice: Subject to any disclaimer, the term of this patent is extended or adjusted under 35 U.S.C. 154(b) by 0 days.

(21) Appl. No.: 16/108,110

(22) Filed: Aug. 22, 2018

(65) Prior Publication Data

US 2020/0035222 A1     Jan. 30, 2020

Related U.S. Application Data

(60) Provisional application No. 62/703,892, filed on Jul. 27, 2018.

(51) Int. Cl.
    *G10L 15/26*     (2006.01)
    *G10L 15/16*     (2006.01)
    (Continued)

(52) U.S. Cl.
    CPC .......... *G10L 15/16* (2013.01); *G06K 9/4628* (2013.01); *G06K 9/6256* (2013.01);
    (Continued)

(58) Field of Classification Search
    CPC ...... G06F 17/2785; G06F 15/18; G06F 17/00; G06F 17/241; G06F 17/212;
    (Continued)

(56) References Cited

U.S. PATENT DOCUMENTS

| | | | |
|---|---|---|---|
| 4,994,983 | A | 2/1991 | Landell et al. |
| 5,390,278 | A | 2/1995 | Gupta et al. |

(Continued)

FOREIGN PATENT DOCUMENTS

| | | |
|---|---|---|
| KR | 20170107283 A | 9/2017 |
| WO | WO2017156640 | 9/2017 |

OTHER PUBLICATIONS

Chung, Y. A., & Glass, J. (2017). Learning Word Embeddings from Speech. arXiv preprint arXiv:1711.01515. Accessible at https://arxiv.org/abs/1711.01515.

(Continued)

*Primary Examiner* — Abdelali Serrou
(74) *Attorney, Agent, or Firm* — Cognition IP, P.C.; Bryant Lee

(57) ABSTRACT

Systems and methods are disclosed for end-to-end neural networks for speech recognition and classification and additional machine learning techniques that may be used in conjunction or separately. Some embodiments comprise multiple neural networks, directly connected to each other to form an end-to-end neural network. One embodiment comprises a convolutional network, a first fully-connected network, a recurrent network, a second fully-connected network, and an output network. Some embodiments are related to generating speech transcriptions, and some embodiments relate to classifying speech into a number of classifications.

20 Claims, 16 Drawing Sheets

(51) Int. Cl.
  *G10L 15/06*    (2013.01)
  *G06N 3/04*     (2006.01)
  *G06K 9/62*     (2006.01)
  *G06N 3/08*     (2006.01)
  *G06K 9/46*     (2006.01)
  *G10L 25/18*    (2013.01)
  *G10L 25/24*    (2013.01)
  *G10L 15/02*    (2006.01)
  *G10L 15/22*    (2006.01)
  *G10L 15/30*    (2013.01)
  *G10L 15/197*   (2013.01)
  *G10L 15/08*    (2006.01)

(52) U.S. Cl.
  CPC ......... *G06K 9/6271* (2013.01); *G06N 3/0445* (2013.01); *G06N 3/0454* (2013.01); *G06N 3/0481* (2013.01); *G06N 3/08* (2013.01); *G06N 3/084* (2013.01); *G10L 15/02* (2013.01); *G10L 15/063* (2013.01); *G10L 15/22* (2013.01); *G10L 15/30* (2013.01); *G10L 25/18* (2013.01); *G10L 25/24* (2013.01); *G10L 15/197* (2013.01); *G10L 2015/0635* (2013.01); *G10L 2015/081* (2013.01)

(58) Field of Classification Search
  CPC .. G06F 17/2229; G06F 17/243; G06F 17/279; G06F 17/2836; G06F 17/289; G06F 3/167; G06F 17/30746; G06F 17/30256; G06F 17/3028; G06F 17/22; G06F 17/2705; G06F 17/30734; G06F 19/00; G10L 15/16; G10L 15/22; G10L 15/02; G10L 15/063; G10L 15/1807; G10L 15/20; G10L 15/25; G10L 15/26; G10L 15/28; G10L 17/02; G10L 17/04; G10L 17/18; G10L 2015/223; G10L 2021/02166; G10L 21/0216; G10L 21/0356; G10L 21/055; G10L 25/30; G10L 25/51; G10L 25/63; G10L 25/90; G10L 15/183; G10L 15/14; G10L 15/193; G10L 2015/0635; G10L 13/00; G10L 15/06; G10L 15/19; G10L 2015/088; G10L 15/083; G10L 15/142; G10L 15/18; G10L 15/187; G10L 17/08; G10L 17/22; G10L 2015/228; G10L 2025/783; G10L 25/24; G10L 25/87; G10L 25/93; G10L 13/08; G10L 15/08; G10L 2015/226; G10L 21/0272; G10L 25/03; G10L 15/78; G10L 15/1815; G10L 15/197; G10L 15/34; G10L 25/18; G10L 25/21; G10L 15/04; G10L 15/05; G10L 15/146; G10L 15/265; G10L 15/10; G10L 15/144; G10L 15/24; G10L 15/32; G10L 2015/025; G10L 25/78

See application file for complete search history.

(56) References Cited

U.S. PATENT DOCUMENTS

| | | | |
|---|---|---|---|
| 5,461,698 A * | 10/1995 | Schwanke ............... | G06N 3/04 706/20 |
| 5,594,834 A | 1/1997 | Wang | |
| 5,649,060 A | 7/1997 | Ellozy | |
| 5,787,393 A * | 7/1998 | Inazumi ................. | G10L 15/16 704/232 |
| 5,940,794 A | 8/1999 | Abe | |
| 5,963,904 A | 10/1999 | Lee et al. | |
| 6,076,056 A | 6/2000 | Huang et al. | |
| 7,177,795 B1 | 2/2007 | Chen et al. | |
| 8,996,372 B1 | 3/2015 | Secker-Walker et al. | |
| 9,117,453 B2 | 8/2015 | Bielby | |
| 9,240,184 B1 | 1/2016 | Lin et al. | |
| 9,263,036 B1 | 2/2016 | Graves | |
| 9,514,753 B2 | 12/2016 | Sharifi et al. | |
| 9,524,716 B2 * | 12/2016 | Sethy ...................... | G10L 15/16 |
| 9,595,002 B2 | 3/2017 | Leeman-Munk et al. | |
| 9,607,618 B2 | 3/2017 | Nissan et al. | |
| 9,620,145 B2 | 4/2017 | Bacchiani et al. | |
| 9,646,634 B2 * | 5/2017 | Sainath ............... | G06N 3/0481 |
| 9,691,020 B2 * | 6/2017 | Matsuda .................. | G06N 3/08 |
| 9,715,496 B1 * | 7/2017 | Sapoznik ............ | G06F 17/2715 |
| 9,786,270 B2 | 10/2017 | Senior et al. | |
| 9,799,327 B1 | 10/2017 | Chan et al. | |
| 9,824,692 B1 | 11/2017 | Khoury et al. | |
| 9,842,585 B2 * | 12/2017 | Huang .................. | G10L 15/063 |
| 9,911,413 B1 | 3/2018 | Kumar et al. | |
| 9,934,775 B2 | 4/2018 | Raitio et al. | |
| 9,972,339 B1 * | 5/2018 | Sundaram ............... | G10L 17/04 |
| 9,984,682 B1 | 5/2018 | Tao et al. | |
| 10,019,985 B2 * | 7/2018 | Heigold ................ | G10L 15/063 |
| 10,089,580 B2 | 10/2018 | Shan et al. | |
| 10,106,153 B1 * | 10/2018 | Xiao ..................... | B60W 30/06 |
| 10,170,107 B1 * | 1/2019 | Dreyer ................ | G10L 15/26 |
| 2005/0075875 A1 | 4/2005 | Shozakai et al. | |
| 2009/0204390 A1 | 8/2009 | Yamamoto et al. | |
| 2009/0210218 A1 | 8/2009 | Collobert et al. | |
| 2010/0004930 A1 | 1/2010 | Strope et al. | |
| 2010/0005061 A1 | 1/2010 | Basco et al. | |
| 2010/0100382 A1 | 4/2010 | Rao et al. | |
| 2010/0299131 A1 | 11/2010 | Lanham et al. | |
| 2012/0072215 A1 | 3/2012 | Yu et al. | |
| 2012/0253812 A1 | 10/2012 | Kalinli et al. | |
| 2012/0310642 A1 | 12/2012 | Cao et al. | |
| 2013/0262096 A1 | 10/2013 | Wilhelms-Tricarico et al. | |
| 2013/0262106 A1 | 10/2013 | Hurvitz et al. | |
| 2014/0142929 A1 | 5/2014 | Seide et al. | |
| 2014/0257803 A1 | 9/2014 | Yu et al. | |
| 2014/0257804 A1 | 9/2014 | Li et al. | |
| 2014/0278379 A1 | 9/2014 | Coccaro et al. | |
| 2015/0066496 A1 | 3/2015 | Deoras et al. | |
| 2015/0106096 A1 | 4/2015 | Toopran et al. | |
| 2015/0127327 A1 | 5/2015 | Bacchiani et al. | |
| 2015/0127594 A1 | 5/2015 | San Martin et al. | |
| 2015/0269931 A1 | 9/2015 | Senior et al. | |
| 2015/0294219 A1 * | 10/2015 | Krizhevsky ............ | G06N 3/084 706/25 |
| 2015/0310862 A1 | 10/2015 | Dauphin et al. | |
| 2016/0034811 A1 | 2/2016 | Paulik et al. | |
| 2016/0132787 A1 | 5/2016 | Drevo et al. | |
| 2016/0140408 A1 * | 5/2016 | Shen .................... | G06K 9/4628 382/157 |
| 2016/0171974 A1 | 6/2016 | Hannun et al. | |
| 2016/0275947 A1 | 9/2016 | Li et al. | |
| 2016/0342895 A1 * | 11/2016 | Gao .................... | G06F 17/2881 |
| 2016/0379632 A1 | 12/2016 | Hoffmeister et al. | |
| 2017/0024641 A1 | 1/2017 | Wierzynski | |
| 2017/0032245 A1 | 2/2017 | Osband et al. | |
| 2017/0032802 A1 * | 2/2017 | Senior .................... | G10L 15/16 |
| 2017/0040016 A1 | 2/2017 | Cui et al. | |
| 2017/0092264 A1 * | 3/2017 | Hakkani-Tur ....... | G06N 99/005 |
| 2017/0103413 A1 | 4/2017 | He et al. | |
| 2017/0103752 A1 * | 4/2017 | Senior .................... | G10L 15/16 |
| 2017/0125020 A1 | 5/2017 | Seo et al. | |
| 2017/0148431 A1 | 5/2017 | Catanzaro et al. | |
| 2017/0148433 A1 | 5/2017 | Catanzaro et al. | |
| 2017/0168586 A1 | 6/2017 | Sinha et al. | |
| 2017/0169812 A1 * | 6/2017 | Lample ............... | G06F 17/2765 |
| 2017/0186446 A1 | 6/2017 | Wosk et al. | |
| 2017/0194002 A1 | 7/2017 | Kim | |
| 2017/0200092 A1 | 7/2017 | Kisilev | |
| 2017/0243085 A1 * | 8/2017 | Vanhoucke .......... | G06K 9/6267 |
| 2017/0270919 A1 * | 9/2017 | Parthasarathi .......... | G10L 15/20 |
| 2017/0286860 A1 * | 10/2017 | Chen .................. | G06N 3/0454 |
| 2017/0323638 A1 | 11/2017 | Malinowski et al. | |
| 2017/0358293 A1 | 12/2017 | Chua et al. | |
| 2017/0358306 A1 | 12/2017 | Xue | |
| 2017/0372200 A1 | 12/2017 | Chen et al. | |

(56) References Cited

U.S. PATENT DOCUMENTS

| | | | |
|---|---|---|---|
| 2017/0372694 A1 | 12/2017 | Ushio | |
| 2018/0025721 A1 | 1/2018 | Li et al. | |
| 2018/0053087 A1* | 2/2018 | Fukuda | G06N 3/0454 |
| 2018/0060724 A1* | 3/2018 | Wang | G06N 3/082 |
| 2018/0061397 A1 | 3/2018 | Huang et al. | |
| 2018/0061439 A1* | 3/2018 | Diamos | G10L 21/10 |
| 2018/0075343 A1 | 3/2018 | Van Den Oord et al. | |
| 2018/0082677 A1* | 3/2018 | Yaghi | G10L 15/16 |
| 2018/0101742 A1 | 4/2018 | Burge et al. | |
| 2018/0114112 A1 | 4/2018 | Willson et al. | |
| 2018/0129931 A1 | 5/2018 | Bradbury et al. | |
| 2018/0189635 A1 | 7/2018 | Olarig et al. | |
| 2018/0190268 A1 | 7/2018 | Lee et al. | |
| 2018/0218733 A1 | 8/2018 | Raanani et al. | |
| 2018/0261204 A1* | 9/2018 | Heigold | G10L 15/16 |
| 2018/0268298 A1* | 9/2018 | Johansen | G06N 3/0454 |
| 2018/0285715 A1* | 10/2018 | Son | G06N 3/04 |
| 2018/0293691 A1* | 10/2018 | Nurvitadhi | G06N 3/04 |
| 2019/0130312 A1* | 5/2019 | Xiong | G06N 20/00 |
| 2019/0180183 A1* | 6/2019 | Diamant | G06N 3/084 |
| 2019/0228274 A1* | 7/2019 | Georgiadis | G06N 3/082 |
| 2019/0244081 A1* | 8/2019 | Franca-Neto | G06N 3/063 |
| 2019/0266246 A1* | 8/2019 | Wang | G06N 3/04 |
| 2019/0279614 A1* | 9/2019 | Ye | G10L 15/187 |
| 2019/0286932 A1* | 9/2019 | Du | G06K 9/2054 |
| 2019/0325276 A1* | 10/2019 | Fu | G06N 3/08 |

OTHER PUBLICATIONS

He, W., Wang, W., & Livescu, K. (2016). Multi-view recurrent neural acoustic word embeddings. arXiv preprint arXiv:1611.04496. Accessible at https://arxiv.org/abs/1611.04496.

Settle, S., & Livescu, K. (Dec. 2016). Discriminative acoustic word embeddings: Recurrent neural network-based approaches. In Spoken Language Technology Workshop (SLT), 2016 IEEE (pp. 503-510). IEEE Accessible at https://arxiv.org/abs/1611.02550.

Xu, Y., Huang, Q., Wang, W., Jackson, P. J., & Plumbley, M. D. (2016). Fully DNN-based multi-label regression for audio tagging. arXiv preprint arXiv:1606.07695. Accessible at https://arxiv.org/abs/1606.07695.

J. A. Bullinaria, "Text to phoneme alignment and mapping for speech technology: A neural networks approach," The 2011 International Joint Conference on Neural Networks, San Jose, CA, 2011, pp. 625-632. Accessible at https://ieeexplore.ieee.org/document/6033279?reload=true.

E. B. Bilcu, J. Suontausta and J. Saarinen, "A study on different neural network architectures applied to text-to-phoneme mapping," 3rd International Symposium on Image and Signal Processing and Analysis, 2003. ISPA 2003 Proceedings of the, 2003, pp. 892-896 vol. 2. Accessible at https://ieeexplore.ieee.org/document/1296405.

Chorowski, J. K., Bandanau, D., Serdyuk, D., Cho, K., & Bengio, Y. (2015). Attention-based models for speech recognition. In Advances in neural information processing systems (pp. 577-585). Accessible at https://arxiv.org/abs/1506.07503.

Bahdanau, D., Chorowski, J., Serdyuk, D., Brakel, P., & Bengio, Y. (Mar. 2016). End-to-end attention-based large vocabulary speech recognition. In Acoustics, Speech and Signal Processing (ICASSP), 2016 IEEE International Conference on (pp. 4945-4949). IEEE. Accessible at https://arxiv.org/abs/1508.04395.

Yao, K., Zweig, G., & Peng, B. (2015). Attention with intention for a neural network conversation model. arXiv preprint arXiv:1510.08565. Accessible at https://arxiv.org/abs/1510.08565.

Fayek, H. M., Lech, M., & Cavedon, L. (Dec. 2015). Towards real-time speech emotion recognition using deep neural networks. In Signal Processing and Communication Systems (ICSPCS), 2015 9th International Conference on (pp. 1-5). IEEE. Accessible at https://researchbank.rmit.edu.au/view/rmit:35616.

Tur, G., Deng, L., Hakkani-Tür, D., & He, X. (Mar. 2012). Towards deeper understanding: Deep convex networks for semantic utterance classification. In Acoustics, Speech and Signal Processing (ICASSP), 2012 IEEE International Conference on (pp. 5045-5048). IEEE. Accessible at https://www.microsoft.com/en-us/research/publication/towards-deeper-understanding-deep-convex-networks-for-semantic-utterance-classification/.

Lim, W., Jang, D., & Lee, T. (Dec. 2016). Speech emotion recognition using convolutional and recurrent neural networks. In Signal and information processing association annual summit and conference (APSIPA), 2016 Asia-Pacific(pp. 1-4). IEEE. Accessible at https://www.semanticscholar.org/paper/Speech-emotion-recognition-using-convolutional-and-Lim-Jang/3c911b052b343ef7f27a064081469261f9t786f0.

Gold, K., & Scassellati, B. (Jan. 2006). Audio speech segmentation without language-specific knowledge. In Proceedings of the Annual Meeting of the Cognitive Science Society (vol. 28, No. 28). Accessible at https://scazlab.yale.edu/sites/default/files/files/Gold-CogSci-06.pdf.

Wang, L., Zhang, C., Woodland, P. C., Gales, M. J., Karanasou, P., Lanchantin, P., . . . & Qian, Y. (Mar. 2016). Improved DNN-based segmentation for multi-genre broadcast audio. In Acoustics, Speech and Signal Processing (ICASSP), 2016 IEEE International Conference on (pp. 5700-5704). IEEE Accessible at https://www.researchgate.net/publication/304372686_Improved_DNN-based_segmentation_for_multi-genre_broadcast_audio.

Ko, T., Peddinti, V., Povey, D., & Khudanpur, S. (2015). Audio augmentation for speech recognition. In Sixteenth Annual Conference of the International Speech Communication Association. Accessible at https://www.danielpovey.com/files/2015_interspeech_augmentation.pdf.

Cui, X., Goel, V., & Kingsbury, B. (2015). Data augmentation for deep neural network acoustic modeling. IEEE/ACM Transactions on Audio, Speech, and Language Processing, 23(9), 1469-1477. Accessible at https://dl.acm.org/citation.cfm?id=2824198.

Wen, T. H., Heidel, A., Lee, H. Y., Tsao, Y., & Lee, L. S. (2013). Recurrent neural network based personalized language modeling by social network crowdsourcing. In Proc. Interspeech. Accessible at https://pdfs.semanticscholar.org/3968/59d51ef805ad90c6daa6c43ca4d9b8a09af2.pdf.

Bellegarda, J. R. (2004). Statistical language model adaptation: review and perspectives. Speech communication, 42(1), 93-108. Accessible at http://citeseerx.ist.psu.edu/viewdoc/download?doi=10.1.1.91.4893&rep=rep1&type=pdf.

Graves, A., Bellemare, M. G., Menick, J., Munos, R., & Kavukcuoglu, K. (2017). Automated curriculum learning for neural networks. arXiv preprint arXiv:1704.03003. Accessible at https://arxiv.org/abs/1704.03003.

Mun, S., Shon, S., Kim, W., Han, D. K., & Ko, H. (Mar. 2017). Deep neural network based learning and transferring mid-level audio features for acoustic scene classification. In Acoustics, Speech and Signal Processing (ICASSP), 2017 IEEE International Conference on (pp. 796-800). IEEE. Accessible at https://ieeexplore.ieee.org/document/7952265.

You, K., Chong, J., Yi, Y., Gonina, E., Hughes, C. J., Chen, Y. K., . . . & Keutzer, K. (2009). Parallel scalability in speech recognition. IEEE Signal Processing Magazine, 26(6). Accessible at http://citeseerx.ist.psu.edu/viewdoc/download?doi=10.1.1.296.8143&rep=rep1&type=pdf.

Hannun, A., Case, C., Casper, J., Catanzaro, B., Diamos, G., Eisen, E., . . . & Ng, A. Y. (2014). Deep speech: Scaling up end-to-end speech recognition. arXiv preprint arXiv:1412.5567. Accessible at https://arxiv.org/abs/1412.5567.

Zhang, S., Zhang, C., You, Z., Zheng, R., & Xu, B. (May 2013). Asynchronous stochastic gradient descent for DNN training. In Acoustics, Speech and Signal Processing (ICASSP), 2013 IEEE International Conference on (pp. 6660-6663). IEEE. Accessible at https://ieeexplore.ieee.org/document/6638950.

Soltau, H., Liao, H., & Sak, H. (2016). Neural speech recognizer: Acoustic-to-word LSTM model for large vocabulary speech recognition. arXiv preprint arXiv:1610.09975. Accessible at https://arxiv.org/abs/1610.09975.

Audhkhasi, K., Ramabhadran, B., Saon, G., Picheny, M., & Nahamoo, D. (2017). Direct acoustics-to-word models for english conversational speech recognition. arXiv preprint arXiv:1703.07754. Accessible at https://arxiv.org/abs/1703.07754.

(56) References Cited

OTHER PUBLICATIONS

Li, J., Ye, G., Zhao, R., Droppo, J., & Gong, Y. (2017). Acoustic-To-Word Model Without OOV. arXiv preprint arXiv:1711.10136. Accessible at https://arxiv.org/abs/1711.10136.

Google Research Blog, Improving End-to-End Models for Speech Recognition, (https://research.googleblog.com/2017/12/improving-end-to-end-models-for-speech.html).

Sinha, A., Sarkar, M., Mukherjee, A., & Krishnamurthy, B. (2017). Introspection: Accelerating neural network training by learning weight evolution. arXiv preprint arXiv:1704.04959. Accessible at https://arxiv.org/pdf/1704.04959.pdf.

Denil, M., Shakibi, B., Dinh, L., & De Freitas, N. (2013). Predicting parameters in deep learning. In Advances in neural information processing systems (pp. 2148-2156). Accessible at https://arxiv.org/abs/1306.0543.

U.S. Appl. No. 16/108,107, filed Aug. 22, 2018. Inventors: Jeff Ward, Adam Sypniewski, Scott Stephenson.

U.S. Appl. No. 16/108,109, filed Aug. 22, 2018. Inventors: Jeff Ward, Adam Sypniewski, Scott Stephenson.

Notice of Allowance dated Nov. 14, 2018 for U.S. Appl. No. 16/108,107; 14 pages.

Non-Final Office Action dated Nov. 15, 2018 for U.S. Appl. No. 16/108,109; 33 pages.

Notice of Allowance for U.S. Appl. No. 16/108,109 dated Mar. 13, 2019; 14 pages.

Office Action issued in U.S. Appl. No. 16/417,722, dated May 28, 2020.

\* cited by examiner

|  |  |  |  |  |  |  |  |  |
|---|---|---|---|---|---|---|---|---|
| Iteration 0 | Audio | The | sixth | sick | sheik's sixth | sheep's | sick. |  |
|  | Text | The | sixth | sick | sheik's | sixth | sheep's | sick. |
| Iteration 1A | Audio | The |  |  | sixth | sick | sheik's | sixth sheep's sick. |
|  | Text | The | sixth | sick | sheik's | sixth | sheep's | sick. |
| Iteration 1B | Audio | The | sixth | sick | sheik's | sixth | sheep's | sick. |
|  | Text | The | sixth | sick | sheik's | sixth | sheep's | sick. |

END-TO-END NEURAL NETWORKS FOR SPEECH RECOGNITION AND CLASSIFICATION

CROSS-REFERENCE TO RELATED APPLICATIONS

This application claims the benefit of U.S. Provisional Patent Application No. 62/703,892, filed Jul. 27, 2018, which is hereby incorporated by reference in its entirety.

BACKGROUND

Recognizing speech is easy for most humans but has proven to be a difficult challenge for computers. Automatic Speech Recognition (ASR) refers to the completely automated transcription of audio to text by computing systems.

Known ASR systems are composed of discrete components which perform a portion of the speech recognition task. For example, ASR systems may include an acoustic model, a decoder, a language model, and a pronunciation model. One type of acoustic model may classify a sequence of audio features as a sequence of phonemes, or units of sound. Typically, the set of phonemes are determined a priori, and the acoustic model selects which of the set of phonemes corresponds to input acoustic features. Some acoustic models rely on hand-tuned descriptions of audio features to detect phonemes.

A pronunciation model then maps the sequence of phonemes to a word by way of a dictionary. The word-to-phoneme dictionary may also be created manually or significantly edited by human experts. An independent language model may then also aid in determining the final transcription by providing a probability of word sequences independent of the acoustic input. These types of ASR systems take much human labor to hand-tune each component and integrate them into a cohesive whole.

SUMMARY

Systems and methods are disclosed for automated speech recognition and classification using end-to-end neural networks and other machine learning techniques that may be used in conjunction or separately.

In an embodiment, an end-to-end speech recognition system for transcribing audio is described. The speech recognition system may comprise several neural network layers: a convolutional network layer, a first fully-connected layer, a recurrent network layer, a second fully-connected layer, and an output network layer. Each layer is directly connected to preceding and subsequent layers. Each layer may consist of multiple sub-layers. The neural network layers may operate on acoustic features such as Mel-Frequency Cepstrum Coefficients (MFCC) or spectrograms, for example.

In an embodiment, an end-to-end speech classification system for classifying audio is described. Rather than produce a transcription of input audio, some embodiments may classify the audio into different classification schemes. For example, an end-to-end speech recognition system may classify spoken words into classes such as semantic topics, gender (e.g., male/female), emotion or sentiment (e.g., angry, sad, happy, etc.), speaker identification (i.e., which user is speaking), speaker age, speaker stress or strain, or other such classifications.

In some embodiments, all layers and stacks of an end-to-end speech recognition system are jointly trained as a single neural network. For example, an end-to-end speech recognition system may be trained as a whole, based on training data that contains audio and a transcription.

In one embodiment, a speech recognition system comprises a processor and a memory. The memory includes instructions for a locally connected neural network configured to receive acoustic features of an utterance and output a first representation of the utterance. The memory includes instructions for a first densely connected neural network configured to receive the first representation of the utterance and output a second representation of the utterance. The memory includes instructions for a recurrent neural network configured to receive the second representation of the utterance from the densely connected neural network and output a third representation of the utterance. The memory includes a second densely connected neural network configured to receive the third representation of the utterance and output a fourth representation of the utterance. The memory includes an output neural network configured to receive the fourth representation of the utterance from the second densely connected neural network and output an indication of one or more words corresponding to the utterance.

In one embodiment, a speech recognition system comprises a locally connected neural network configured to process a first representation of an utterance to produce a second representation of the utterance. The speech recognition system further comprises a first set of neural network nodes for processing the second representation of the utterance. The speech recognition system further comprises a recurrent neural network configured to receive the processed second representation of the utterance and produce a third representation of the utterance. The speech recognition system further comprises a second set of neural network nodes for processing the third representation of the utterance. The speech recognition system further comprises an output neural network configured to receive the processed third representation of the utterance and output an indication of one or more words corresponding to the utterance.

Certain techniques for improving the performance of neural networks or other machine learning models are disclosed, which are applicable for other tasks other than automated speech recognition and classification. These techniques may be applied to different machine learning models and are not limited to automated speech recognition or classification or to neural networks.

In an embodiment, a deep learning-based iterative word alignment system is described. The deep learning-based iterative word alignment system may comprise an end-to-end phoneme recognition system that produces a transcript of phonemes from audio. The audio-generated phonemes may be aligned with phonemes extracted from a text transcript using an iterative beam search that uses prior alignments as hints for subsequent alignments.

In an embodiment, a neural network is trained using a batch of training samples comprising audio sequences, which may be represented as tensors, where it may be desirable for each of the training samples to have the same length. Tensors that are shorter than the longest training sample may be repeated until all the tensors are of the same length as the longest training sample, rather than zeroing out excess elements or using null characters. In one embodiment, each of the tensors is a row of a multi-dimensional tensor.

In an embodiment, an expert knowledge store is provided that comprises a plurality of expert neural network layer portions that each correspond to a selector. Characteristics of a neural network may be used to select an expert neural network layer portion from the expert knowledge store based on the selectors. A selected expert neural network layer portion may be inserted into the neural network. In subsequent time steps, other expert neural network layers portions may be used to replace the selected expert neural network layer portion.

In an embodiment, a neural network node weights predictor predicts node weights for new words added to a general vocabulary. The weights predictor may be trained using words in a general vocabulary, based on features such as phonetic representation and frequency. A custom vocabulary may be provided with new words that do not appear in the general vocabulary. The weights predictor may predict neural network nodes weights for the new words.

In an embodiment, a customization layer is provided in a neural network, such as end-to-end speech recognition system, end-to-end speech classification system, or end-to-end phoneme recognition system. The customization layer may customize the output of the neural network for a custom vocabulary by adjusting the probabilities of each output of the neural network according based on characteristics of the custom vocabulary and a general vocabulary. The customization may be performed based on the observed frequency of each output in the custom vocabulary as compared to the observed frequency of each output in the general vocabulary.

In an embodiment, a reinforcement learning algorithm, such as a multi-armed bandit algorithm, is used to select training sets to use to train a neural network to increase performance on a custom vocabulary. The reinforcement learning algorithm may be positively reinforced when the word error rate on the custom vocabulary decreases and may be negatively reinforced when the word error rate on the custom vocabulary increases. The training sets may be subsets of a general training set used to train on a general vocabulary.

In an embodiment, a training data augmentation and streaming system is described. The training data augmentation and streaming system may augment training data on the fly by applying one or more augmentation effects to stored training data. The augmented training data may be streamed to a neural network training process to train a neural network, without the need to store the augmented training data long term.

In an embodiment, parallelization of an inference task is performed by dividing an input audio file into chunks and storing a corresponding index for each chunk. The audio chunks may be dynamically scheduled to GPU processes that perform inference using a neural network. The inference processes may be performed in parallel. After inference, the resulting outputs may be recombined.

In an embodiment, an internal state representation of a neural network is captured during the processing of audio input. The internal state representation may be derived from the pattern of neural network output activations during processing. The internal state representation may be stored with the audio input and a generated transcription for later processing. In one embodiment, the internal state representations may be used for a search task. In another embodiment, the internal state representations may be used for later machine learning tasks, such as classification.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 15 illustrates an example method of training a neural network for a custom domain by selecting portions of a general training dataset to train on.

In the drawings, reference numbers may be reused to identify similar and/or identical elements.

DETAILED DESCRIPTION

Figure 1:
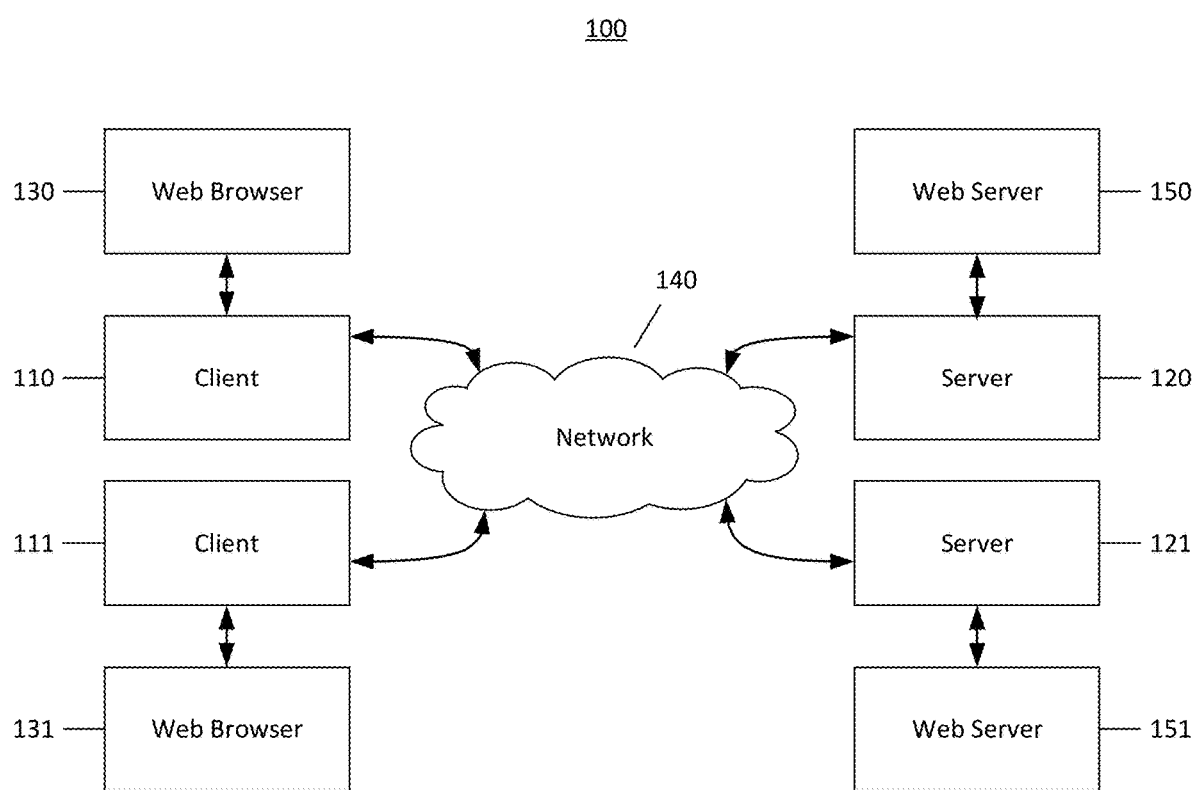
FIG. 1 illustrates an exemplary network environment where some embodiments of the invention may operate

Embodiments described herein relate to end-to-end neural network speech recognition systems. Some disclosed embodiments form a single neural network from input to output. Because of this unitary architecture, the disclosed speech recognition systems are able to be trained solely by data driven techniques, eschewing laborious hand-tuning and increasing accuracy.

Traditional speech pipelines need tens of people working together to build a model over several months. If one portion of the pipeline is altered, then all interfaces with the standard pipeline may be affected. Embodiments disclosed herein are trained by data-driven techniques only, without the need for human intervention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of embodiments of the invention. It shall also be understood that throughout this disclosure that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "an embodiment," "some embodiments," or "embodiments" means that a particular feature, structure, characteristic, or function described in connection with the embodiment is included in at least one embodiment of the invention and may be included more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that unless otherwise noted: (1) steps may optionally be performed; (2) steps may not be limited to the specific order set forth herein; (3) steps may be performed in different orders; and (4) steps may be done concurrently.

FIG. 1 illustrates an exemplary network environment 100 where some embodiments of the invention may operate. The network environment 100 may include multiple clients 110, 111 connected to one or more servers 120, 121 via a network 140. Network 140 may include a local area network (LAN), a wide area network (WAN), a telephone network, such as the Public Switched Telephone Network (PSTN), an intranet, the Internet, or a combination of networks. Two clients 110, 111 and two servers 120, 121 have been illustrated for simplicity, though in practice there may be more or fewer clients and servers. Clients and servers may be computer systems of any type. In some cases, clients may act as servers and servers may act as clients. Clients and servers may be implemented as a number of networked computer devices, though they are illustrated as a single entity. Clients may operate web browsers 130, 131, respectively for display web pages, websites, and other content on the World Wide Web (WWW). Clients 110, 111 may also access content from the network 140 using applications, or apps, rather than web browsers 130, 131. Servers may operate web servers 150, 151, respectively for serving content over the network 140, such as the web.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

Figure 2:
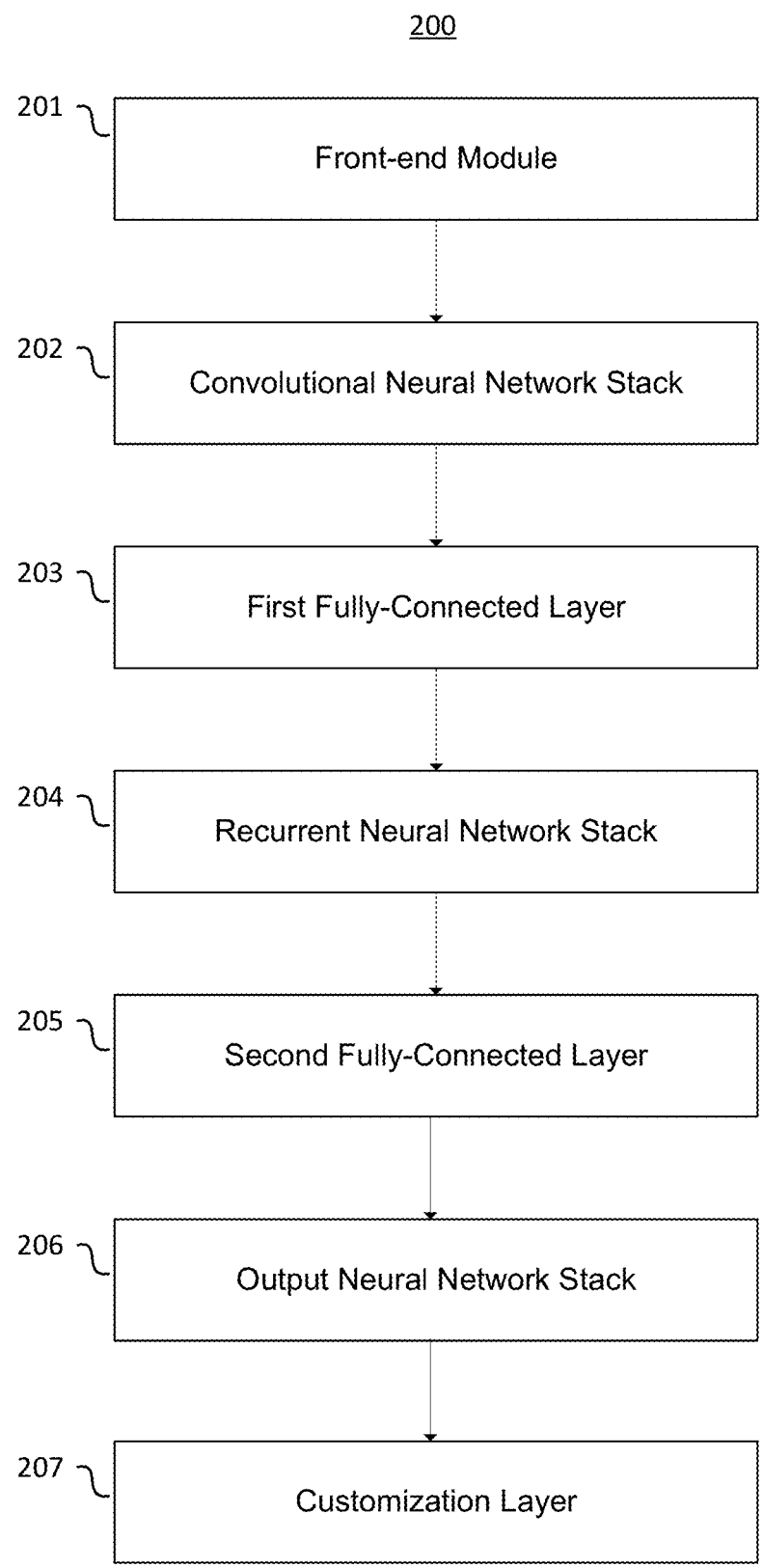
FIG. 2 illustrates an end-to-end speech recognition system according to an embodiment.

FIG. 2 illustrates an end-to-end speech recognition system 200 according to an embodiment. The example end-to-end speech recognition system 200 illustrated in FIG. 2 is configured to transcribe spoken word into written text. Speech recognition system 200 comprises front-end module 201, convolutional neural network (CNN) stack 202, first fully-connected layer 203, recurrent neural network (RNN) stack 204, second fully-connected layer 205, output neural network stack 206, and optional customization layer 207. In end-to-end speech recognition system 200, each subcomponent connects directly to the next. The entire end-to-end speech recognition system 200 may operate as a single neural network. The input to end-to-end speech recognition system 200 is audio information, and the output is a word-by-word transcription of the input audio.

Neural networks comprise a plurality of neural network nodes organized in one or more layers. Each node has one or more inputs, an activation function, and an output. The inputs and output may generally be real number values. The inputs to the node are combined through a linear combination with weights and the activation function is applied to the result to produce the output. The output of a node may be expressed Output=$g(W_0+W_1 x_1+W_2 x_2+ \ldots +W_i X_i)$ where $W_i$ are weights, $X_i$ are input values, and g is the activation function. The output may be transmitted as an input to one or more other nodes in subsequent layers. The weights in the linear combination may be referred to as the weights of the node, and each node may have different weights. Neural network nodes may be organized in one or more layers. An input layer may comprise input nodes whose values may correspond to inputs to the neural network, without use of an activation function. An output layer may comprise one or more output nodes corresponding to output from the neural network. Neural network layers other than the input layer and output layer may be hidden layers, and the nodes in those layers may be referred to as hidden nodes.

For clarity in explanation, the primary stacks that make up end-to-end speech recognition system 200 may be roughly analogized to components of a traditional ASR system, though the components of end-to-end speech recognition system 200 are not so rigidly defined as in a traditional ASR system. For example, CNN stack 202 detects features of the input audio stream and RNN stack 204 classifies groups of features as words, roughly similar to an acoustic model and a pronunciation dictionary. However, CNN stack 202 does not produce a discrete phoneme stream output, and RNN stack 204 does not expressly use a language model or hand-coded dictionary. Instead, the features produced by CNN stack 202 are entirely learned in the training process, and RNN stack 204 learns relationships between sounds and words through training as well. No hand-coded dictionaries or manual interventions are used throughout. Each layer or stack of end-to-end speech recognition system 200 is described in further detail below.

Front-end module 201 produces acoustic features from audio input. Front-end module 201 receives raw audio data and applies a series of transformations and filters to generate acoustic features suitable for speech recognition by the following neural networks. In an embodiment, the input audio is a recording of an utterance that may be segmented on relative silence such that the input audio comprises an entire utterance. An utterance may be one or more words. For example, the input audio may be a 7-10 second long recording of a speaker speaking a word, phrase, or series of words and/or phrases. In some embodiments, the input audio may be an entire sentence. In some embodiments, the input audio is segmented based on time intervals rather than relative silence. In some embodiments, the input audio is segment is based on a combination of features, such as relative silence, time, and other features.

Front-end module 201 may filter the input audio to isolate or emphasize frequency bands relevant to speech recognition. For example, front-end module 201 may low-pass filter the input audio at a predetermined frequency to remove high frequency information beyond the range of speech. Similarly, front-end module may filter the input audio with high-pass filters, band-pass filters, dynamic range compressors, dynamic range expanders, or similar audio filtering techniques suitable for processing audio for speech recognition.

Front-end module 201 may then segment the input recording of an utterance into a series of frames. For example, the input utterance recording may be split into a series of frames of audio data 10 milliseconds long, such that one second of input audio may be split into 100 frames. In some embodiments, the frames may overlap. For example, one second of input audio may be divided into 100 frames that are 25 milliseconds in length, spaced at 10 millisecond intervals. Any frame duration, spacing, and overlap may be used as appropriate for any given implementation as determined by one skilled in the art.

In some embodiments, front-end module 201 may output raw audio information for consumption by subsequent layers. In other embodiments, front-end module 201 may further process the audio frames before outputting. For example, in some embodiments, front-end module 201 generates spectrograms of audio frames. The spectrograms for each frame may then be arranged sequentially, producing a two-dimensional representation of the input audio that reflects the frequency content over time. In this way, the front-end module may generate a visual, two-dimensional representation of the input audio for the following neural networks.

In some embodiments, front-end module 201 generates other features of the input audio frames. Examples of feature representations include: log-mel filterbanks, Mel-Frequency Cepstral Coefficients (MFCC), and perceptual linear prediction coefficients, among other similar acoustic feature representations. In an embodiment, an MFCC representation of each frame may be visualized as a linear vector similar to the spectrogram example above, and similarly rotated and stacked side-by-side to produce a 2-dimensional visual representation of the audio input over time.

The relevant parameters of front-end module 201 include the number of frames, the width and overlap of frames, the type of features determined, and the number of features per frame. Each of these parameters may be chosen by one skilled in the art for any given implementation.

Figure 3:
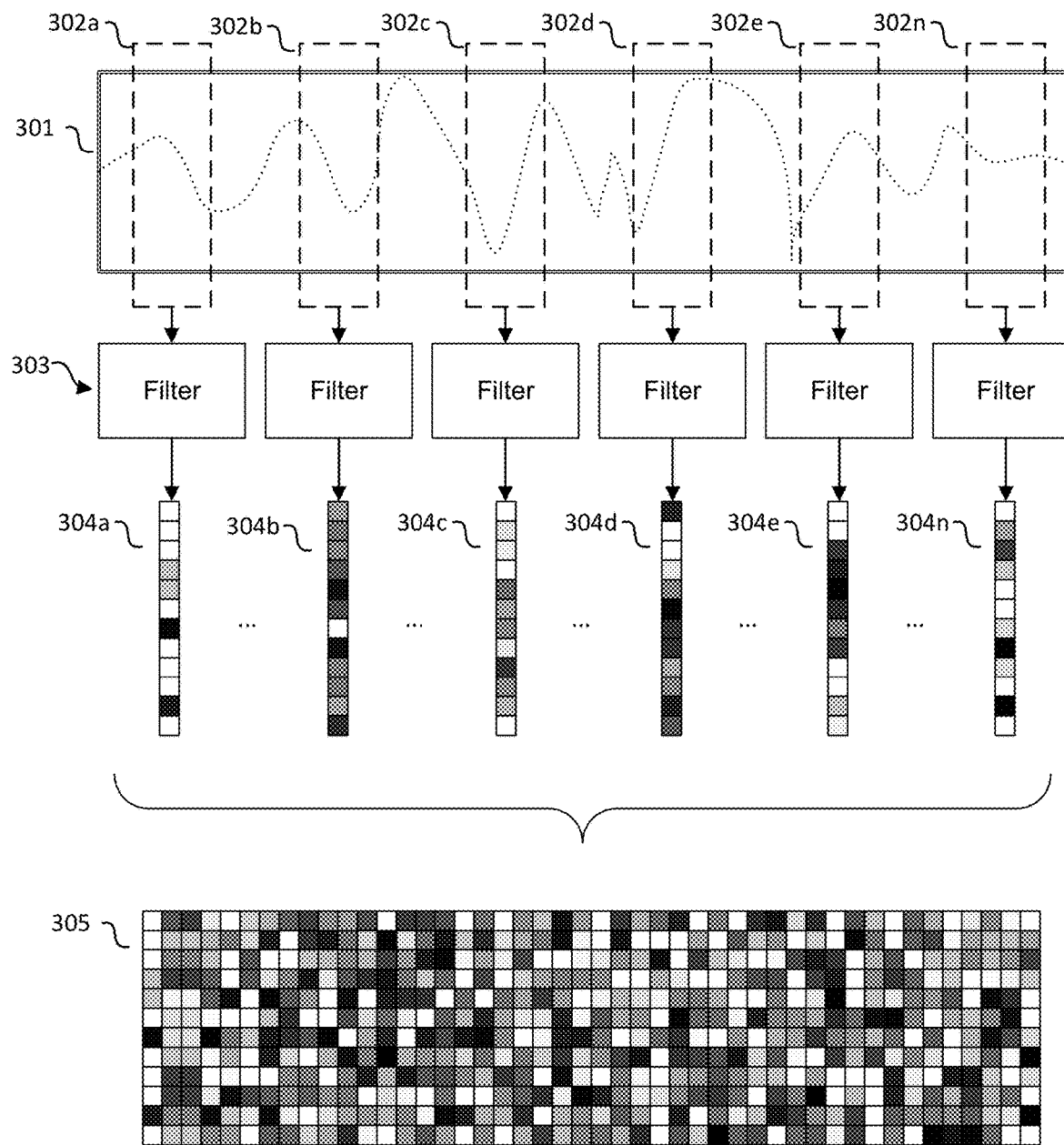
FIG. 3 illustrates an example of audio features produced by a front-end module according to an embodiment.

FIG. 3 illustrates an example of audio features produced by a front-end module such as front-end module 201. In FIG. 3, audio input 301 is divided into windows 302*a-n*. For the sake of illustration, only some audio windows 302*a-n* are illustrated in FIG. 3. In most embodiments, audio windows would either abut or overlap such that the entire audio input is processed. Each window of audio data is then processed by a filter 303. In an embodiment, filter 303 produces an MFCC representation 304 of each window of audio data. For the purposes of illustration, MFCC representations 304*a-n* comprise 12 coefficients, but any number of coefficients may be used. As illustrated, the shade of each coefficient in MFCC representations 304*a-n* represent an intensity of each coefficient, corresponding to some feature or quality of the audio stream. A plurality of feature representations are joined together to form a single representation 305 of the entire audio input. This representation 305 may be illustrated as a 2-dimensional image as shown in FIG. 3.

Representations of greater or less than 1-dimension or 2-dimensions may also be used to represent frames, and frames may be represented in the system as tensors. The term tensor is used to refer to a vector or matrix of any number of dimensions. A tensor may have dimension 0 (scalar), dimension 1 (vector), dimension 2 (2-dimensional matrix), or any higher number of dimensions such as 3, 4, 5, and so on. The multi-dimensional property of some tensors makes them a useful tool for representing neural networks and also the data representations between neural network layers.

Returning to FIG. 2, CNN stack 202 receive the representation of the audio input from front-end module 201. CNN stack 202 processes the audio features to determine a first set of features. Specifically, CNN stack 202 generates a number of feature maps corresponding to a number of convolutional filters, where each convolutional filter represents some characteristic or feature of the audio input. This step may be regarded as roughly analogous to determining a phoneme representation of input audio, however CNN stack 202 does not discretize the output to a set number of acoustic representations. The features determined by CNN stack 202 are not limited to a predetermined set of phonemes. Because it is not so limited, CNN stack 202 can encode a wide range of information.

CNN stack 202 may include any number of convolutional layers, each including various size convolutional kernels. The relevant hyperparameters of CNN stack 202 include the dimension and number of CNN stack, the dimension and number of convolutional kernels at each layer, the stride of the convolutional kernels, and the number and function of any pooling stack. Convolutional kernels may be square, such as of size 5×5, or rectangular, such as of size 3×9, for example. Rectangular convolutional kernels that are 'narrow' along the time-axis may be more sensitive to features that are spread out over a wide range of frequencies but local to a short time period. Similarly, rectangular convolutional kernels that are 'wider' along the time-axis may detect acoustic features that are confined to a relatively narrow audio band but are of longer duration in time. Convolution kernels may also be referred to as windows, filters, or feature detectors.

In an embodiment, the size of the convolutional kernel also determines the number of connections between the input layer and at least the first hidden layer of neural network nodes of the CNN. Each node in the first hidden layer of the CNN has an input edge from each of the input values in the convolutional kernel centered on that node. For example, if the convolutional kernel has size 5×5, then a hidden neural network node in the first hidden layer has 25 inbound edges, one from each of the input values in a 5×5 square in the vicinity of the neural network node, and the hidden neural network node does not have inbound edges from other input values outside of the convolutional kernel. In an embodiment, the subsequent hidden layers of the same CNN stack or later CNN stacks operate in the same manner, but the inbound edges come not from the input values but from the preceding CNN layer. Each subsequent neural network node in the CNN stack has inbound connections from preceding CNN nodes in only a local area defined around the subsequent neural network node, where the local area may be defined by the size of the convolutional kernel. This property also implies that a given hidden layer node of a CNN also only has outbound edges to hidden layer nodes of the next layer that are in the vicinity of the given hidden layer node. The outbound connections of a hidden layer node may also correspond to the size of the convolutional kernel.

A CNN is one type of locally connected neural network because the neural network nodes of each layer are connected only to nodes of the preceding layer of the neural network that are in the local vicinity of the neural network nodes. Moreover, a CNN may also be referred to as one type of sparsely connected neural network because the edges are sparse, meaning that most neural network nodes in a layer are not connected to the majority of neural network nodes in the following layer. The aforementioned definitions may exclude the output or input layer as necessary given that the input layer has no preceding layer and the output layer has no subsequent layer. A CNN is only one type of locally connected or sparsely connected neural network, and there are other types of locally connected or sparsely connect neural networks.

Individual convolutional layers may produce an output activation map that is approximately the same dimensionality as the input to the layer. In other words, the convolutional kernel may operate on all or nearly all input values to a convolutional layer. Convolutional layers may also incorporate a stride factor wherein the convolutional kernel may be shifted by 2 or more pixels per iteration and produce an activation map of a correspondingly reduced dimensionality. Stride factors for each layer of CNN stack 202 may be determined by one of skill in the art for each implementation.

CNN stack 202 may include pooling layers in between convolutional layers. Pooling layers are another mechanism to reduce dimensionality. For example, a pooling layer may operate on a 2×2 window of an activation map with a stride of 2 and select the maximum value within the window, referred to as a max pooling operation. This example pooling layer reduces the dimensionality of an activation map by a factor of 4. Other dimensions of pooling stack may be used between convolutional stack to reduce dimensionality, for example 1×2, 1×3, or other pooling dimensions.

In some embodiments, the input to CNN stack 202 is all frames of audio features produced by front-end module 201 and no segmenting or windowing is involved. In these embodiments, convolutional kernel dimension, stride, and pooling dimensions may be selected so as to retain temporal information. In an embodiment, this is accomplished by reducing dimensions only the frequency dimension, such that the output of CNN stack 202 has a time dimension equal to its input. In any embodiment, CNN stack 202 produce a set of features corresponding to sounds in the audio input.

In some embodiments, the input to CNN stack 202 is a segment of frames of audio features produced by front-end module 201. For each output frame, a context of frames before and/or after the output frame may be included in the segment. For example, for each frame of audio, CNN stack 202 may operate on a 'window' of the 5 previous frames and the following 5 frames, for a total of 11 frames. In this example, if there are 40 audio features per frame, CNN stack 202 would then operate on an input having dimensions of 11×40. Through selection of the hyperparameters for CNN stack 202, the output for a segment may be dimensioned smaller in the time dimension than its input. In other words, CNN stack 202 may resize in the temporal dimension so as to produce a different dimensioned output for each input segment of frames. For example, an embodiment of CNN stack 202 may have an input of dimension 11×40 and an output for each feature of width 1 in the time dimension.

Figure 4:
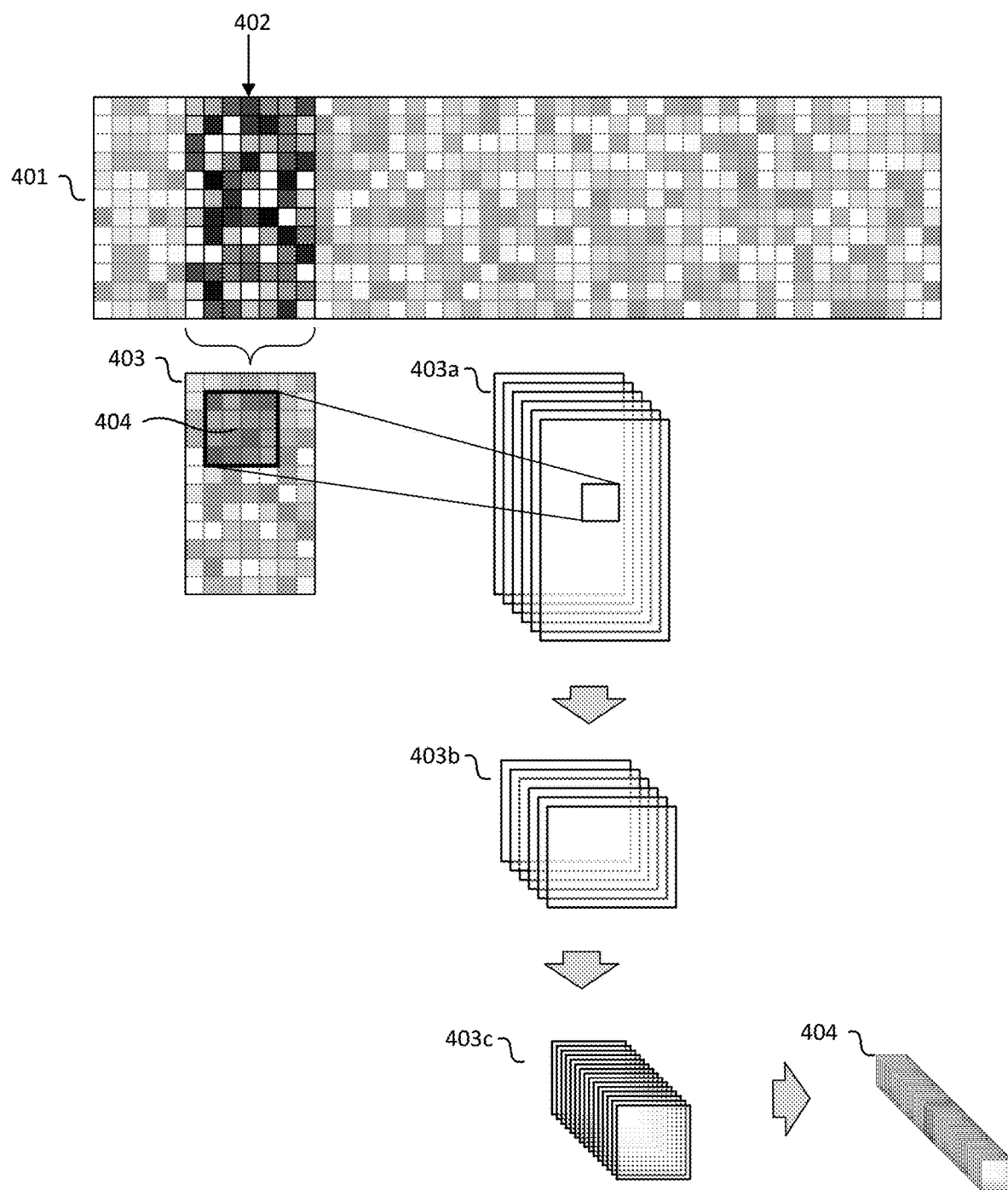
FIG. 4 illustrates an example CNN stack architecture according to an embodiment.

FIG. 4 illustrates an example CNN stack architecture according to an embodiment. Acoustic feature representation 401 may be a representation such as an MFCC representation as illustrated in FIG. 3. Each horizontal division is a frame, and each vertical division indicates a different MFCC coefficient value. In the illustration, a highlighted window 403 of 7 frames centered around a central frame 402. This segment of frames is then processed by one or more convolutional and pooling neural network layers that make up a convolutional neural network stack such as CNN stack 202 discussed above. In FIG. 4, a single convolutional kernel 404 is illustrated, and a number of network layers as illustrated by network layers 403a-c. After a number of network layers, a final dataset 404 is produced corresponding to a number of features that describe input frame 402. As illustrated, the final dataset 404 may be a volume with a first dimension corresponding to time, a second dimension corresponding to features of the audio at a point in time, such as frequencies or coefficients, and a third dimension corresponding to various filters. The illustrated number and arrangement of datasets and layers is for illustrative purposes only, it is to be understood that any combination of convolutional and/or pooling layers would be used in an implementation as determined by one of skill in the art.

Returning to FIG. 2, first fully-connected layer 203 receives features from CNN stack 202 and produces a second set of features. A fully-connected neural network is a neural network in which all nodes in a layer of the neural network are connected to all nodes of the subsequent layer of the neural network. A fully-connected layer 203 comprises one or more fully-connected neural networks placed end-to-end. The term fully-connected comes from the fact that each layer is fully-connected to the subsequent layer. A fully-connected neural network is one kind of densely connected neural network, where a densely connected neural network is one where most of the nodes in each layer of the neural network have edge connections to most of the nodes in the subsequent layer. The aforementioned definitions may exclude the output layer which has no outbound connections.

In an embodiment, the first fully-connected layer 203 is implemented as a fully-connected neural network that is repeated across the entire segment that is output by the CNN stack 202, and each copy of the fully-connected neural network accepts as input a single strided frame. Strided frame refers to the frames output by the CNN stack 202, which may be obtained by slicing the final dataset 404 in the time dimension so that each strided frame refers to a single point in time. There may be fewer strided frames than input frames to the CNN stack 202 due to striding or pooling, though in some embodiments they could be the same in number. Each strided frame retains features of the audio at the point in time and features in the depth dimension created by the various convolutional filters. Each copy of the fully-connected neural network shares the same parameters, in particular each of the weights of all of the nodes of the fully-connected neural network, which allows for computational and memory efficiency because the size of the fully-connected neural network corresponds to a single strided frame rather than the segment and one copy of the fully-connected neural network may be stored and reused. It should be understood that the repetition of the fully-connected neural network across the segment is a reuse of the neural network per strided frame and would not require actually creating a separate copy of the neural network in memory per strided frame. The output of each fully-connected neural network is a tensor comprising features of the strided frame, which is input into the following layer.

First fully-connected layer 203 serves several functions. First, the dimensionality of the first fully-connected layer 203 may be selected so as to resize the output of CNN stack 202. Second, the fully-connected stack may learn additional features that the CNN stack 202 are not able to detect.

First fully-connected layer 203 may resize the output of CNN stack 202 for consumption by the subsequent stack. For example, CNN stack 202 may produce a high dimensioned output based on the number of feature maps used and the frequency context of the output. In some embodiments, the first fully-connected layer 203 may reduce the dimension of this output to reduce the number of parameters subsequent stack need to process. Further, this flexibility allows various implementations to optimize the hyperparameters of various stacks independently of one-another while retaining compatibility between stacks.

First fully-connected layer 203 may also learn additional features. In some embodiments, first fully-connected layer 203 may learn features that CNN stack 202 are not sensitive to. For example, the first fully-connected layer 203 is not limited to local connections between nodes so concepts that require considering tensor values that are distant may be learned. Moreover, the first fully-connected layer 203 may combine information collected from multiple different feature maps generated by different convolutional kernels.

The output of the CNN stack 202 and first fully-connected layer 203 may be thought of as roughly analogous to a phoneme representation of the input audio sequence, even though no hardcoded phoneme model is used. The similarity is that these network layers produce an output that describes the acoustic features of the input audio in sequence. In embodiments where the audio was segmented or windowed prior to the CNN stack 202, the output is a series of short temporal axis slices corresponding to acoustic features in each audio segment or window. In embodiments where the CNN stack 202 operate on the entirety of the audio input, the output of first fully-connected layer 203 is a representation of the activation of acoustic features over the entire time of the input. In any embodiment, the output from CNN stack 202 and first fully-connected layer 203 is a set of features that describe acoustic features of the audio input.

Recurrent Neural Network (RNN) stack 204 receives these features from first fully-connected stack 203 and produces a third set of features. In an embodiment, the input features comprises a set of tensors 501a-n with one tensor corresponding to each strided frame, and the corresponding tensor produced by the first fully-connected layer representing features of the associated strided frame. Each of the tensors 501a-n is generated from the fully-connected neural network that operates per strided frame produced by the CNN stack 202. All of the tensors may be iterated over by the RNN stack 204 in order to process the information in a sequential, temporal manner. RNN stack 204 may be regarded as roughly analogous to a language model in that it receives acoustic features and outputs features related to words that correspond to acoustic features. RNN stack 204 may include various types of recurrent neural network layers, such as Long Short-Term Memory (LSTM) neural network layers and/or Gated Recurrent Unit (GRU) neural network layers. LSTM and GRU type recurrent neural network cells and layers include mechanisms for retaining or discarding information from previous frames when updating their hidden states.

LSTM and GRU type RNNs include at least one back loop where the output activation of a neural network enters as an input to the neural network at the next time step. In other words, the output activation of at least one neural network node is an input to at least one neural network node of the same or a prior layer in a successive time step. More specifically, the LSTM or GRU compute a hidden state, comprising a vector, through a series of mathematical operations, which is produced as an output of the neural network at each time step. The hidden state is passed as an input to the next time step of the LSTM or GRU. In an embodiment, an LSTM has three inputs at a particular time step, the hidden step passed from the previous time step, the output tensor value of the previous time step, and the input frame or tensor representation of the frame of the current time step. At each time step, the LSTM produces both a hidden state and output tensor value. In an embodiment, a GRU has two inputs at a particular time step, the hidden step passed form the previous time step and the input frame or tensor representation of the frame of the current time step. In a GRU, the hidden state and output tensor value are the same tensor and thus only a single tensor value is output.

In an embodiment, the LSTM may comprise a forget gate layer comprising a neural network layer with a sigmoid activation function and a pointwise multiplication gate for determining which elements of the input hidden state to preserve. The LSTM may comprise an update gate layer comprising a neural network layer with a sigmoid activation function and a neural network layer with a tan h activation function that are both input to a pointwise multiplication gate. The product may be input to a pointwise addition gate with the hidden state to add data to the hidden state. The LSTM may comprise an output gate layer comprising a neural network layer with a sigmoid activation function input to a pointwise multiplication gate with the other input being the hidden state after being passed through the tan h function. The result of this operation may be output as the tensor output of the LSTM at the current time step. Other implementations and variations of an LSTM may also be used, and the LSTM is not limited to this embodiment.

In an embodiment, the GRU may comprise an update gate layer for determining how much information from the prior hidden state to pass on to the future. The update gate layer may comprise a pointwise addition gate and a neural network layer with a sigmoid activation function. The GRU may comprise a reset gate layer for deciding how much prior hidden state information to forget. The reset gate layer may comprise a pointwise addition gate and a neural network layer with a sigmoid activation function. Other implementations and variations of a GRU may also be used, and the GRU is not limited to this embodiment.

RNN stack 204 processes the tensors representing the strided frames in sequence, and its output for each strided frame is dependent on previously processed frames. RNN stack 204 may include either unidirectional or bidirectional RNN layers. Unidirectional RNN stack operate in one direction in time, such that current frame predictions are only based on previously observed inputs. Bidirectional RNN layers are trained both forward in time and backward in time. Bidirectional RNNs may therefore make current-frame predictions based on both preceding frames and following frames. In an unidirectional RNN, the tensors corresponding to frames are processed sequentially by the RNN in a single direction such as front to back or back to front. In a bidirectional RNN, the tensors corresponding to frames may be processed in both directions, front to back and back to front, with the information produced from the forward and backward runs combined at the end of processing, such as by concatenation, addition, or other operations.

Figures 5, 6:
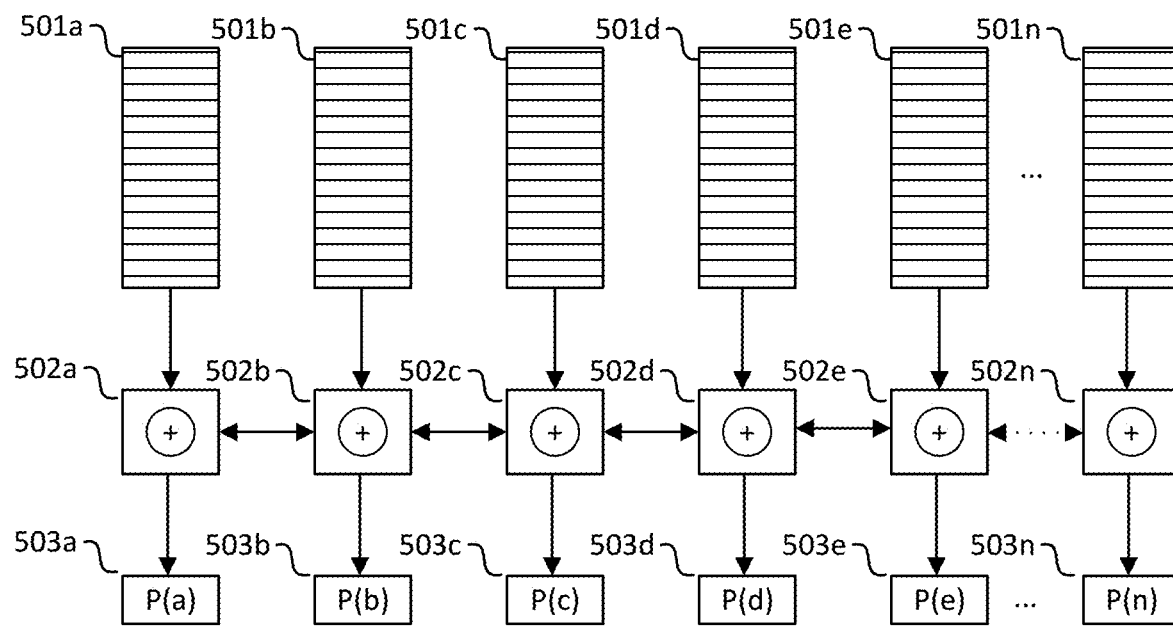
FIG. 5 illustrates an example RNN stack architecture according to an embodiment.
FIG. 6 illustrates an example transcription output of an end-to-end speech recognition system according to an embodiment.

FIG. 5 illustrates an example RNN stack architecture according to an embodiment. Features 501a-n are received from first fully-connected layer 203. In an embodiment, each of features 501a-n corresponds to a single strided frame. These features are input into recurrent neural network 502. Recurrent neural network 502 is illustrated as 'unrolled' network elements 502a-n, each corresponding to the input from one of features 501a-n, to show the temporal operation of RNN 502 at each time step. Recurrent neural network 502 is a bidirectional recurrent neural network, as illustrated by the bidirectional arrows connecting elements 502a-n. The diagram shows that data is passed from the RNN at the prior time step to the next time step. As a bidirectional RNN, data is passed from the RNN at the successive time step to the prior time step in a backward pass through the features 501a-n. Other embodiments may utilize unidirectional RNN architectures. While recurrent neural network 502 is illustrated as a single layer for the purposes of illustration, it is to be understood that the recurrent network may include any number of layers. For each time step, recurrent neural network 502 produces a set of features related to a word prediction 503a-n at that time step. This set of features is expressed as a tensor or vector output and is directly input to subsequent layers.

Returning to FIG. 2, a second fully-connected stack 205 receives the output features from RNN stack 204 and produces a word embedding. Similar to first fully-connected stack 203, second fully-connected stack 205 serves several functions. In an embodiment, second fully-connected stack 205 reduces the dimensionality of the output of RNN stack 204 to something more concise. In an embodiment, second fully-connected stack 205 produces a word embedding of significantly reduced dimension compared to the output of RNN stack 204. This word embedding contains information related to the word predicted for a given time frame, and also information regarding words around the predicted word.

This word embedding, or word vector, representation is then passed to output stack 206. Output stack 206 has an output node for each word of a vocabulary and a blank or null output. For each frame of input audio data, output stack 206 produces a probability distribution over its output nodes for a word transcription or a null output. For each spoken word in the input audio, one frame of the output sequence will be desired to have a high probability prediction for a word of the vocabulary. All other frames of audio data that correspond to the word will be desired to contain the null or blank output. The alignment of a word prediction with the audio of the word is dependent on the hyperparameters of the various stacks and the data used for training. For example, if the recurrent stack is unidirectional, the word prediction must come after a sufficient amount of audio frames corresponding to the word have been processed, likely near or around the end of the spoken word. If the recurrent stack is bidirectional, the alignment of the word prediction may be more towards the middle of the spoken word, for example. The learned alignments are dependent on the training data used. If the training data have word transcriptions aligned to the beginning of words, the RNN stack will learn a similar alignment.

FIG. 6 illustrates an example output of a transcription from an example output stack of an example end-to-end speech recognition system. The output stack will produce a prediction of which word corresponds to the audio for each time frame. Here, the output 600 for an example time frame is illustrated as a table with words in the first column and corresponding probabilities in the second column. In this example, the word "Carrot" has the highest prediction for this time frame with a weighted prediction of 0.90, or 90% likelihood.

Returning to FIG. 2, in some embodiments, a complete transcription output may be determined from the output of end-to-end speech recognition system 200 by choosing the highest probability predicted word at each frame. In some embodiments, the output probabilities of end-to-end speech recognition system 200 may be modified by a customization layer 207 based on a set of custom prior probabilities to tailor the transcription behavior for certain applications. In this way, a single, general training set may be used for a number of different applications that have varying prior probabilities.

Customization layer 207 may be useful, for example, to resolve ambiguities between homophones, to increase priors for words that rarely occur in the training data but are expected to occur frequently in a particular application, or to emphasize particular proper nouns that are expected to occur frequently. In an embodiment, the custom priors applied may be determined from a statistical analysis of a corpus of data. For example, if end-to-end speech recognition system 200 is employed by a particular company, documents from that company may be analyzed to determine relative frequency of words. The output of end-to-end speech recognition system 200 may then be modified by these custom priors to reflect the language usage of the company. In this way, end-to-end speech recognition system 200 may be trained once on a general training dataset and customized for a number of particular use cases while using the same trained model.

Figure 7:
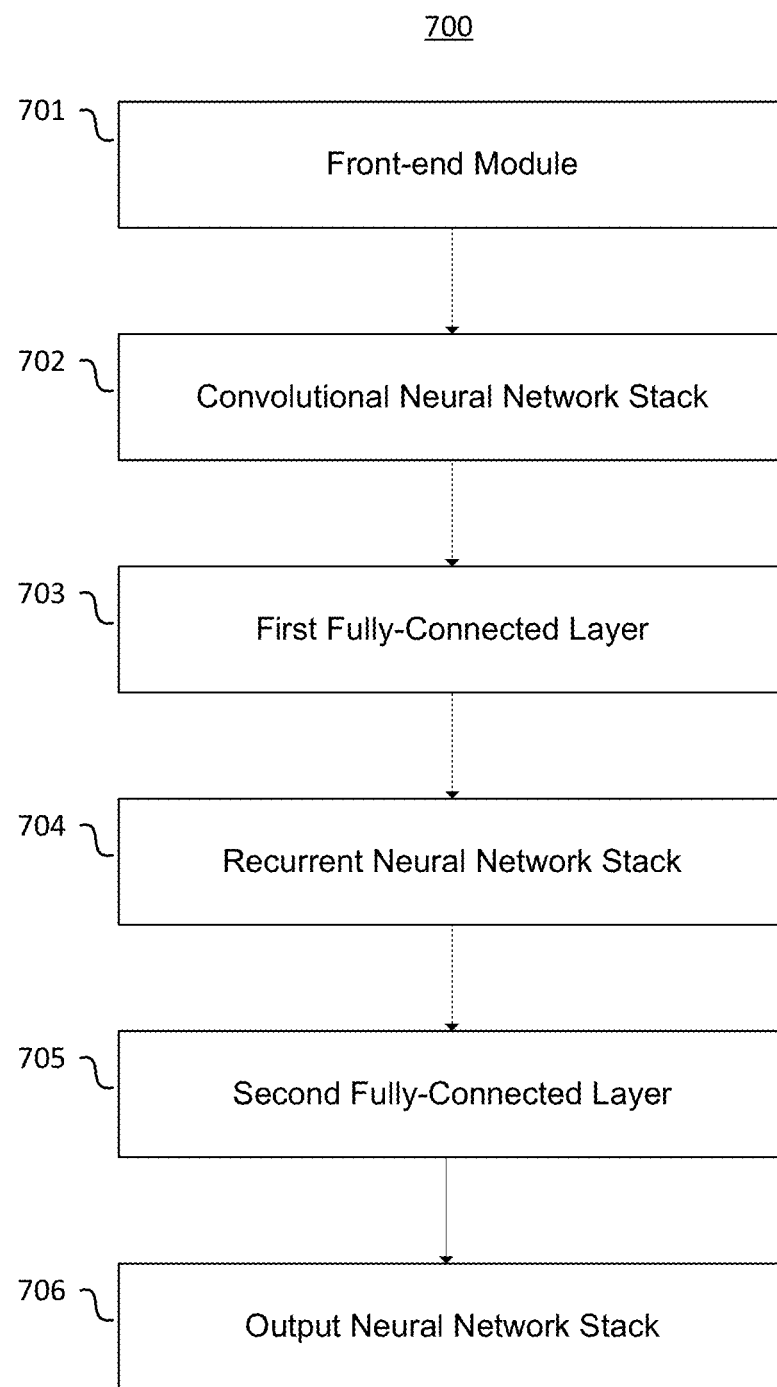
FIG. 7 illustrates an end-to-end speech recognition system according to an embodiment.

FIG. 7 illustrates an end-to-end speech classification system 700 according to an embodiment. The example end-to-end speech classification system 700 illustrated in FIG. 7 is configured to classify spoken words into a set of classifications rather than generate a transcription. For example, end-to-end speech recognition classification 700 may classify a spoken word or set of words into classes such as semantic topic (e.g., sports, politics, news), gender (e.g., male/female), emotion or sentiment (e.g., angry, sad, happy, etc.), speaker identification (i.e., which user is speaking), speaker age, speaker stress or strain, or other such classifications.

An advantage of the disclosed neural network architecture over traditional ASR systems using discrete components is that the same neural network architecture described above may be repurposed to learn classifications, instead of speech recognition. The neural network architecture learns the appropriate features automatically instead of requiring hand tuning. As such, the architecture of end-to-end speech classification system 700 is identical to that of end-to-end speech recognition system 200 as illustrated in FIG. 2 except for the output neural network stack 706. Front-end module 701 may be identical to front-end module 201, CNN stack 702 may be identical to CNN stack 202, first fully-connected layer 703 may be identical to first fully-connected layer 203, and RNN stack 704 may be identical to RNN stack 204. While the identity and order of the components may be the same, the hyperparameters and number and order of hidden nodes of each particular layer or stack may be separately tuned for the classification task. The configuration of each implementation will depend on the particular categorization goal and various implementation concerns such as efficacy, efficiency, computing platform, and other such factors. Similarly, the trained hidden nodes of any layer or component are learned through the training process and may differ between various implementations. For example, the convolutional kernels used by a gender classification implementation may be very different than those used by a transcription implementation.

The architecture and implementation details of end-to-end speech recognition system 200 as shown in FIGS. 2-6 and as described in the related sections of the description may also be used for end-to-end classification system 700, aside from a change to the output neural network stack 706. In other words, end-to-end speech recognition system 200 may be used for speech classification by simply changing the output layer, removing output network 206 and replacing it with output network 706.

One difference between end-to-end speech classification system 700 and end-to-end speech recognition system 200 is the output neural network stack 706. The output neural network stack 706 of end-to-end speech classification system 700 contains categories related to the classification scheme being used rather than words in a vocabulary. As an example, an output neural network stack 706 of an example end-to-end speech recognition system 700 may have two output nodes, one for male and one for female. Alternatively, a single output node may be used for the binary classification of male or female. The output of this example would be to classify spoken word as either male or female. Any number of classifications may be used to classify speech by output neural network stack 706. For multi-class classification, such as semantic topic, emotion or sentiment, speaker identification, speaker age, or speaker stress or strain, a single output node may be provided in output layer 706 for each potential classification, where the value of each output node is the probability that the spoken word or words corresponds to the associated classification. While not illustrated, there may be a customization layer that modifies the output of output neural network stack 706 similar to customization layer 207 discussed in connection with FIG. 2. A customization layer may alter predicted outputs based on some external guidance, similar to customization layer 207.

Figure 8:
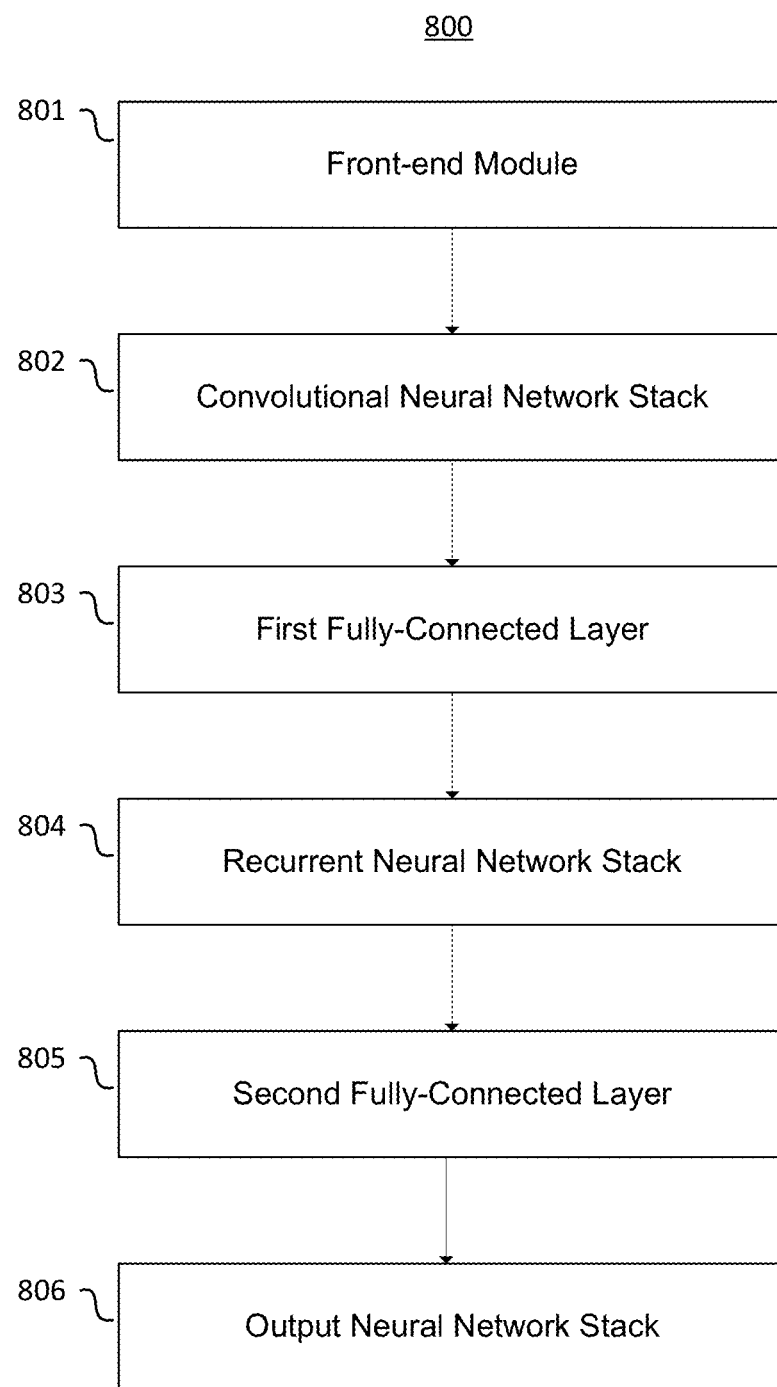
FIG. 8 illustrates an end-to-end phoneme recognition system according to an embodiment.

FIG. 8 illustrates an end-to-end phoneme recognition system 800 according to an embodiment. The example end-to-end phoneme recognition system 800 illustrated in FIG. 8 is configured to generate a set of phonemes from audio rather than generate a transcription. For example, end-to-end phoneme recognition system 800 may generate a sequence of phonemes corresponding to spoken words rather than a transcription of the words. A useful application of the end-to-end phoneme recognition system 800 is for addressing the text alignment problem, in other words, aligning an audio file with a set of text that is known to correspond to the audio. Text alignment may be used to split training examples that comprise lengthy audio files with lengthy corresponding text transcripts into shorter training examples that are easier to fit into computer memory. By performing text alignment, portions of the audio file may be associated with their corresponding portions of the text transcript. These portions may then be extracted or used as points of division and used as shorter training examples.

As described above, the disclosed neural network architecture has the advantage over traditional ASR systems of being able to be repurposed to other classification-type tasks without hand tuning. The architecture of end-to-end phoneme recognition system 800 is identical to that of end-to-end speech recognition system 200 as illustrated in FIG. 2 and end-to-end speech classification system 700 as illustrated in FIG. 7 except for the output neural network stack 806. Front-end module 801 may be identical to front-end module 201, CNN stack 802 may be identical to CNN stack 202, first fully-connected layer 803 may be identical to first fully-connected layer 203, and RNN stack 804 may be identical to RNN stack 204. While the identity and order of the components may be the same, the hyperparameters and number and order of hidden nodes of each particular layer or stack may be separately tuned for the phoneme recognition task. The configuration of the implementation will depend on implementation concerns such as efficacy, efficiency, computing platform, and other such factors. Similarly the trained hidden nodes of any layer or component are learned through the training process and may differ between various implementations. For example, the convolutional kernels used by a phoneme recognition implementation may be very different than those used by a transcription implementation.

The architecture and implementation details of end-to-end speech recognition system 200 and end-to-end speech classification system 700 as shown in FIGS. 2-7 and as described in the related sections of the description may also be used for end-to-end phoneme recognition system 800, aside from a change to the output neural network stack 806. In other words, end-to-end speech recognition system 200 may be used for phoneme recognition by simply changing the output layer, removing output network 206 and replacing it with output network 806.

One difference between end-to-end speech recognition system 200 and end-to-end phoneme recognition system 800 is the output neural network stack 806. The output neural network stack 806 of end-to-end phoneme recognition system 800 contains phonemes rather than words in a vocabulary. In an embodiment, one output node may be provided in the output layer 806 per phoneme, where the value of each output node is the probability that the audio input corresponds to the associated phoneme. In one embodiment, 40 phonemes may be provided via a total of 40 nodes in the output layer 806. In an embodiment, other numbers of phonemes may be provided such as 26, 36, 42, or 44. While not illustrated, there may be a customization layer that modifies the output of output neural network stack 806 similar to customization layer 207 discussed in connection with FIG. 2. A customization layer may alter predicted outputs based on some external guidance, similar to customization layer 207.

The phoneme recognition system 800 may be used to perform text alignment. An audio file and a corresponding text transcript are provided, and it is desired to match the corresponding audio features to the appropriate text. Initially, the audio file may be processed through phoneme recognition system 800 to produce a predicted sequence of audio phonemes. The text file may also be processed to translate the textual words to text phonemes. The text file may be converted to phonemes by iterating over the text and using known mappings of words to the corresponding phonemes. Alternatively, mappings from syllables to phonemes or from sequences of characters to phonemes may be used and may be applied to the text iteratively.

Figure 9A:
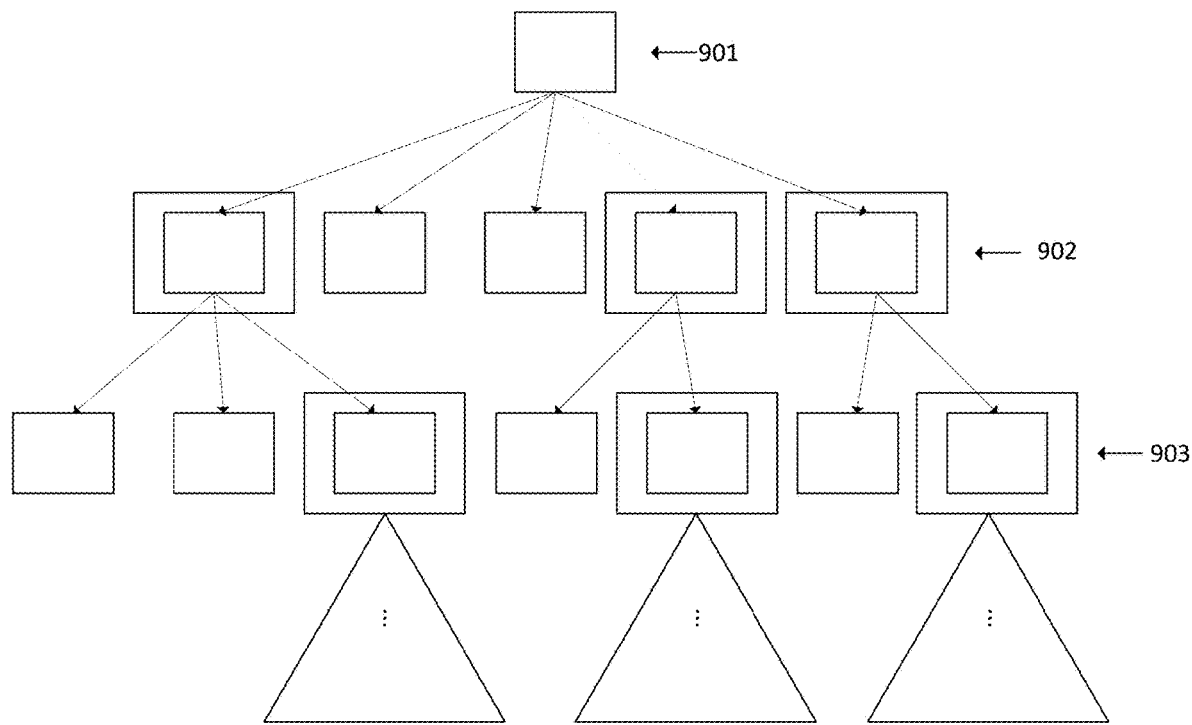
FIG. 9A illustrates an iterative beam search according to an embodiment.

FIG. 9A illustrates an iterative beam search that is used in some embodiments. In the first iteration of the iterative beam search, the mapping of the audio phonemes and text phonemes may be set in a few possible ways. First, the text phonemes could be assumed to be evenly spaced in time and mapped to the audio phoneme at the corresponding time stamp of the audio file. Second, an estimated distribution of text phonemes over time may be determined based on the rate of speech in the audio file and regions of dead silence or high density talking. An estimated time stamp for each text phoneme may be derived for each time stamp based on this distribution, and each text phoneme may then be mapped to the audio phoneme at the corresponding time stamp of the audio file. Third, the audio phonemes and text phonemes could be matched one-to-one starting from the beginning of the audio phonemes and beginning of the text phonemes until the number of phonemes is exhausted. The first iteration of the iterative beam search is represented by the starting node of the search at layer 901.

At each iteration of the iterative beam search, the mappings or alignments of audio phonemes to text phonemes from the prior iteration are used as a starting point and then changed to create multiple new mappings or alignments, which are known as candidates. The candidates are scored and the n best-scoring candidates are selected for expansion at the next level of the iterative beam search, where n is the branching factor of the iterative beam search. By expanding only n candidates at each level, the algorithm avoids having to expand an exponential number of candidate nodes, which could be the case if a traditional breadth-first search is used.

Layer 902, for example, is the next layer following starting layer 901 of the iterative beam search. Each of the nodes at layer 902 are generated by adjusting the alignment provided at the starting node in layer 901. The best n in layer 902 are selected according to a heuristic scoring function as shown by nodes highlighted by the rectangles in FIG. 9A. Candidates at layer 903 are created by using the selected best n nodes at layer 902 as a starting point and adjusting the alignments provided at those nodes. Nodes at layer 902 that were not selected for the set of best n are not expanded and not used as the starting point for adjustments. Therefore, iterative beam search is not guaranteed to find the optimal solution because it prunes parts of the tree during the search. However, the iterative beam search performs well in practice and is computationally efficient.

At layer 903, the candidates are again scored and the n best scoring are again expanded for the next level. The process may continue until a stopping condition is reached. In an embodiment, the process stops when the number of matching phonemes between the audio phonemes and text phonemes does not change at the next iteration.

A novel feature of the iterative beam search is the use of the parent alignment from the prior iteration as a hint to the nodes at the next level. The hint increases the score of candidates that are closer to the alignment of the prior mapping and decreases the score of candidates that are farther from the alignment of the prior mapping. In an embodiment, the hint is implemented by increasing the value of the scoring function when a candidate alignment changes little from its parent alignment but decreasing the value of the scoring function when a candidate alignment changes a lot from its parent alignment.

In an embodiment, the scoring function for evaluating candidate alignments produces a score based on the number of matching phonemes, that is, the number of audio phonemes and text phonemes that are mapped to each other and are the same phoneme; the number of missed phonemes, meaning the number of audio phonemes or text phonemes that are not mapped to any phoneme in the other set; and the distance from the hint, where the hint is the alignment at the parent iteration of the beam search. In an embodiment, the distance from the hint is evaluated by iterating over the audio phonemes or text phonemes and producing a score for each of the phonemes. The score is higher when the audio phoneme or text phoneme has stayed in the same position or changed position only a little and lower when the audio phoneme or text phoneme has moved to a significantly farther position, where the distance may be measured by, for example, time or number of phoneme positions moved. The per-phoneme scores are then combined, such as by summation, to produce a score for the distance from the hint. The hint may act as a weight keeping the children alignments closer to the parent alignment.

Figure 9B:
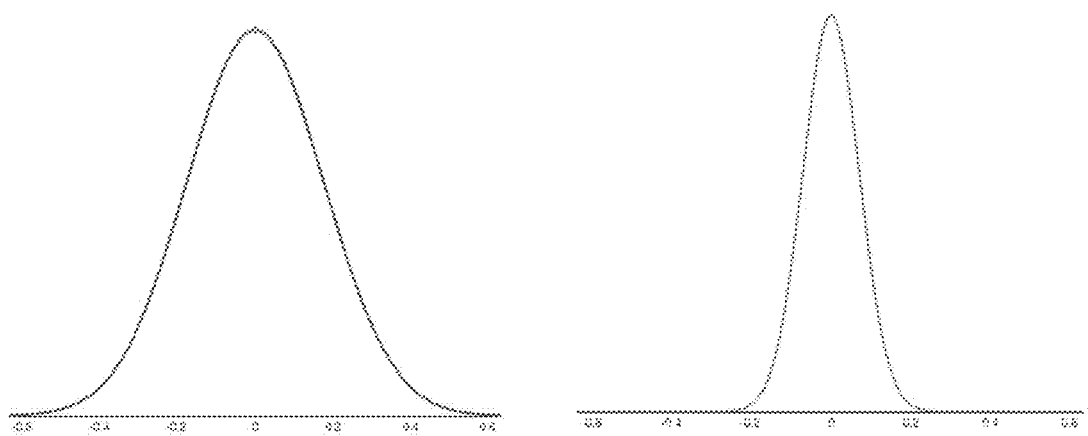
FIG. 9B illustrates exemplary radial basis functions used in an iterative beam search according to an embodiment.

As illustrated in FIG. 9B, in an embodiment, the distance score for phonemes may be implemented with a radial basis function (RBF). In an embodiment, the RBF accepts as input the distance between the phoneme at its parent location and its current location in the new candidate alignment. When the distance is zero, the RBF is at its peak value. The RBF is symmetric around the origin, and the value may drop steeply for input values farther from the origin. In an embodiment, the parameters of the RBF may be adjusted between iterations of the iterative beam search make the curve steeper at later iterations of the beam search. As a result, the penalty in the scoring function for the phoneme's current location not matching its location in the parent alignment increases in later iterations. The effect is to allow the iterative beam search to make relatively large adjustments to the alignment in initial iterations but to reduce the amount of change in the alignments in later iterations. FIG. 9B illustrates two RBFs, a broader RBF on the left that may be used in earlier iterations of the iterative beam search and a steeper RBF on the right that may be used in later iterations of the iterative beam search. The illustrated RBFs are exemplary and other RBFs and non-RBF functions may be used for scoring distance between a phoneme's prior alignment and the current alignment.

Figures 9C, 10:
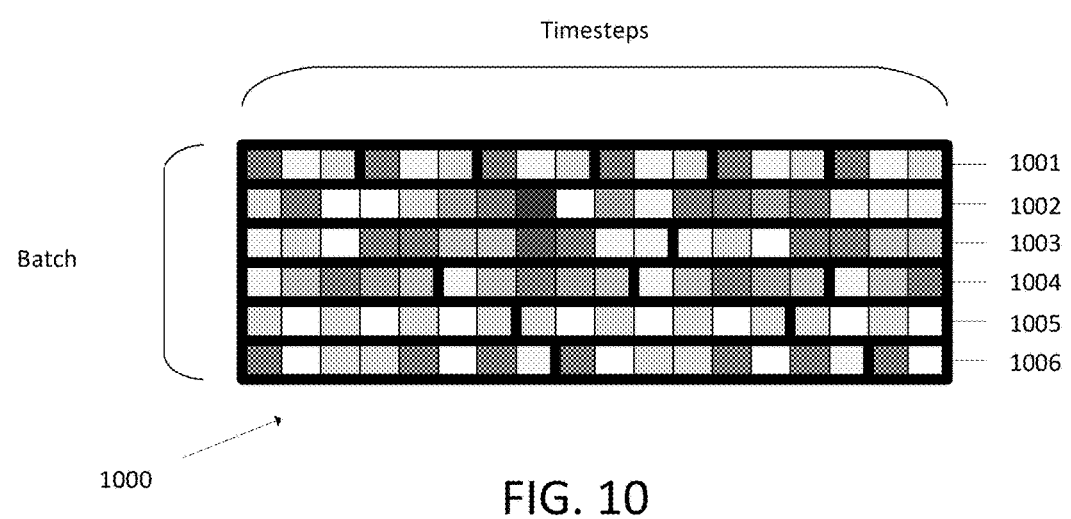
FIG. 9C illustrates an example use of iterative beam search according to an embodiment.
FIG. 10 illustrates an example of looping training samples in a training batch that are shorter than a longest training sample.

FIG. 9C illustrates an embodiment of the text alignment algorithm using iterative beam search using a well-known tongue twister. In the initial iteration, a mapping between audio phonemes and text phonemes is created. The initial mapping is close but not exactly correct. In the subsequent iteration, the alignments of the phonemes are adjusted from the initial mapping and the new candidate alignments are rescored. A candidate alignment 1A is created, which matches the phonemes for "the" and "sixth" but misses several other phonemes and has unmatched phonemes for "sixth," "sheep's", and "sick." Moreover, the candidate alignment 1A moves the phonemes two words to the right from the parent alignment, which is lower scoring than if the phonemes were moved a smaller distance. In an embodiment, candidate alignment 1B has a higher score, according to the heuristic scoring function, candidate alignment 1A. It matches a higher number of phonemes and has no missing phonemes. Moreover, the phonemes were moved a smaller distance from the location of the phonemes in the parent alignment (only moved one word to the left). The example shown in FIG. 9C is illustrative only and other embodiments may operate in a different manner and use different scoring functions.

Iterative beam search may be used in a variety of machine learning applications and is not limited to use with neural networks or for the application of speech recognition.

Turning to the method of training the neural networks, in some embodiments, all layers and stacks of an end-to-end speech recognition system 200, end-to-end speech classification system 700, or end-to-end phoneme recognition system 800 are jointly trained as a single neural network. For example, end-to-end speech recognition system 200, end-to-end speech classification system 700, or end-to-end phoneme recognition system 800 may be trained as a whole, based on training data that contains audio and an associated ground-truth output, such as a transcription. In some embodiments, training may use stochastic gradient descent with initial weights randomly initialized. In an embodiment, training may use back propagation to adjust the weights of the neural network nodes in the neural network layers by using the partial derivative of a loss function. In one embodiment, the loss function may be represented by $$J(\theta) = -\frac{1}{m}\left[\sum_{i=1}^{m}\sum_{k=1}^{K} y_k^{(i)}\log(h_\theta(x^{(i)}))_k (1-y_k^{(i)})\log(1-(h_\theta(x^{(i)})))_k\right].$$

The value of the loss function depends on the training examples used and the difference between the output of the system 200, system 700, or system 800 and the known ground-truth value for each training example. An optional regularization expression may be added to the loss function in which case the value of the loss function may also depend on the magnitude of the weights of the neural network. Backpropagation may be used to compute the partial derivative of the loss function with respect to each weight of each node of each layer of the neural network, starting from the final layer and iteratively processing the layers from back to front. Each of the weights may then be updated according to the computed partial derivative by using, for example, gradient descent. For example, a percentage of the weight's partial derivative, or gradient, may be subtracted from the weight, where the percentage is determined by a configurable learning rate.

In an embodiment, training is performed on a batch of utterances at a time. In some embodiments, the utterances in a training batch must be of the same length. Having samples of the same length may simplify tensor operations performed in the forward propagation and backward propagation stages, which may be implemented in part through matrix multiplications with matrices of fixed dimension. For the matrix operations to be performed, it may be necessary that each of the training samples have the same length. The batch of training samples may be created by splitting an audio file into utterances, such as 7-10 second long portions which may correspond to a word, phrase, or series of words and/or phrases. In an audio file, naturally some utterances may be longer or shorter than others. In an embodiment where training samples must be the same length, techniques may be used to adjust the length of some of the samples.

In the past, the length of training samples has been adjusted by padding shorter samples with zeros or other special characters indicating no data. While this allows creating training samples of the same size, the zeros or special characters may lead to artifacts in the model and cause slower training.

FIG. 10 illustrates an example of looping each of the shorter training samples in a training batch so that the shorter training samples are repeated until they are the same length as the longest training sample. A set of training samples is created by splitting an audio file. The training samples are processed by front-end module 201 to create a sequence of frames comprising each training sample, where the frames may be of any of the types described above such as log-mel filterbanks, MFCC, perceptual linear prediction coefficients, or spectrograms. Each of the training samples may be stored as a row of tensor 1000 to create a training batch. The length of the tensor 1000 in the time dimension is determined by the length of the longest sample 1002 in terms of the number of frames. Longest sample 1002 is not changed. Each of the shorter samples 1001, 1003, 1004, 1005, 1006 in the batch are repeated until they are the same length as the longest sample 1002, so that every row of the tensor has the same length. The shorter samples are repeated exactly in all of their elements starting from the first element through the last element of the sample. When the length of a sample does not divide evenly into the length of the tensor, the last repetition of the sample may only be a partial repetition until the desired length is reached. The partial repetition is a repetition of the shorter sample starting from the first element and iteratively repeating through subsequent elements of the sample until the desired length is reached. In an embodiment, shorter sample 1001 is repeated k times where $$k = \text{floor}\left(\frac{N}{M}\right)$$

where N is the length of the longest sample and M is the length of shorter sample 1001, and the last repetition of shorter sample 1001 is of length Z=N mod M. Although only two dimensions of the tensor 1000 are illustrated, the tensor 1000 may have many more dimensions. For example, each row may be a multi-dimensional tensor, such as when the frames in the rows are multi-dimensional tensors.

In an embodiment, the training samples of a training batch are stored as rows in a single tensor. In other embodiments, the training samples are not stored in a single tensor. For example, the training samples may be stored as a list or set and input into the neural network one by one. In an embodiment, the CNN layer (such as CNN layer 202, CNN layer 702, or CNN layer 802) is of a fixed size. In an embodiment, the CNN layer accepts input tensor representations up to a fixed length, and the longest sample in a training batch is selected to be less than the fixed length of the CNN layer.

In an embodiment, during training, a ground-truth output value may be provided in tensor 1000 attached to each of the frames of the training samples in tensor 1000. In this embodiment, the ground-truth output values may also be repeated for the shorter samples, when the frames of the shorter samples are repeated in tensor 1000. In an embodiment, a second tensor, separate from tensor 1000, is provided with the ground-truth output values, instead of storing the ground-truth values in tensor 1000. The ground-truth output values in the second tensor may be repeated for shorter samples just as with tensor 1000. However, in other embodiments, the ground-truth output values in the second tensor are not repeated, even though the corresponding training samples in tensor 1000 are repeated.

Padding the shorter training samples by repetition has several advantages over padding with zeros or special characters indicating no data. When zeros or other meaningless data is used, no information is encoded and computation time is wasted in processing that data leading to slower learning or model convergence. By repeating the input sequence, the neural network can learn from all elements of the input, and there is no meaningless or throw-away padding present. The result is faster convergence and learning, better computational utilization, and better behaved and regularized models.

Although looping of shorter samples in a batch was described above with reference to training, the repetition of shorter samples to be the same length as a longest sequence may also be performed during inference. In some embodiments, inference is performed on a tensor similar to tensor 1000 with multiple samples obtained by splitting an audio file. Each sample may be stored in a row of the tensor. The same process described above for training may be applied during inference. A longest sample may be unchanged, and each of the shorter samples may be repeated until they are the same length as the longest sample so that every row of the tensor is the same length. The tensor, with the repetitions of shorter samples, may be input to the neural network for inference.

The technique of looping shorter training samples in a training batch may be used in a variety of machine learning applications and is not limited to use for the application of speech recognition.

Figure 11A:
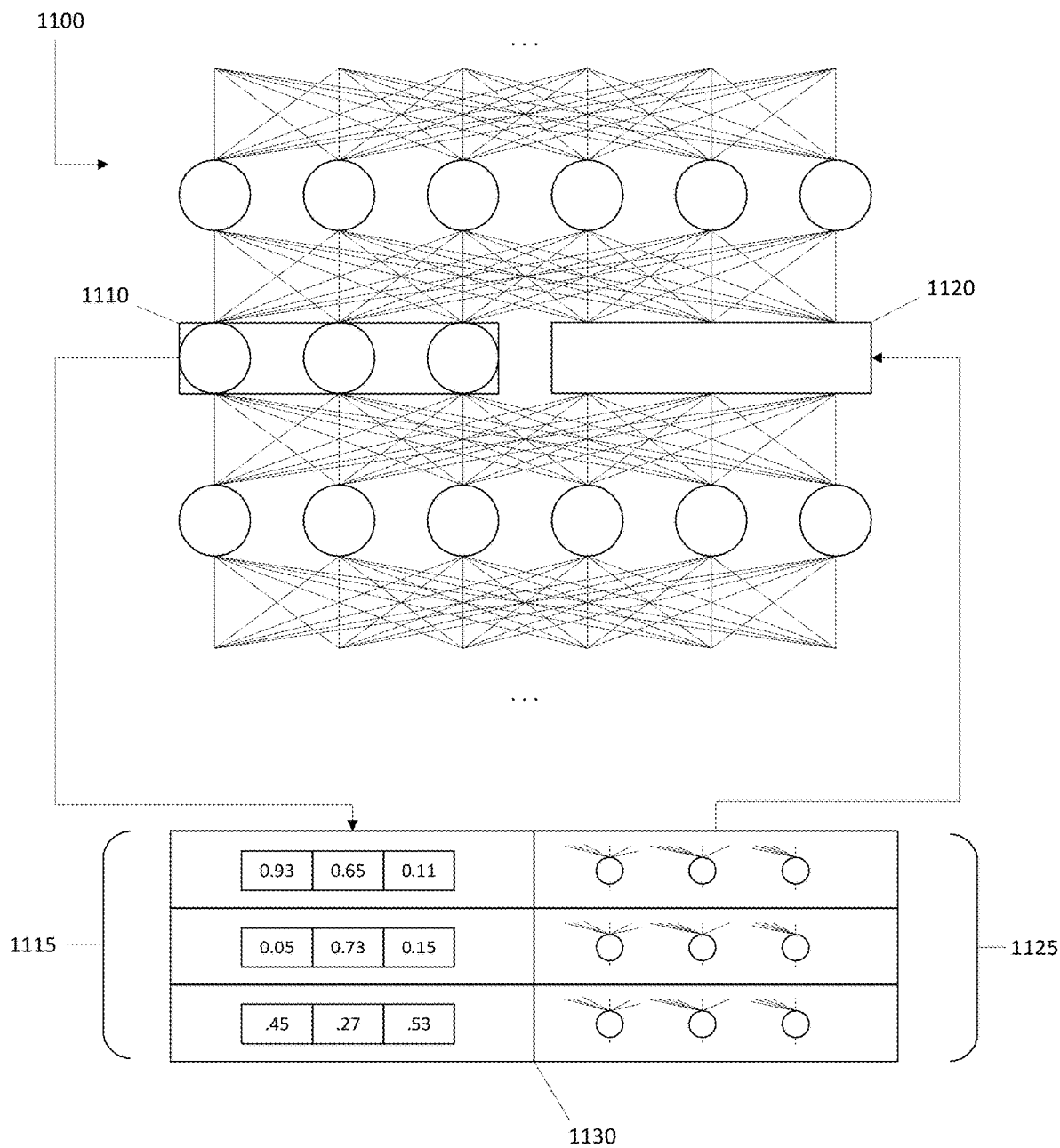
FIGS. 11A-B illustrates an example attention mechanism for a neural network.
Figure 11B:
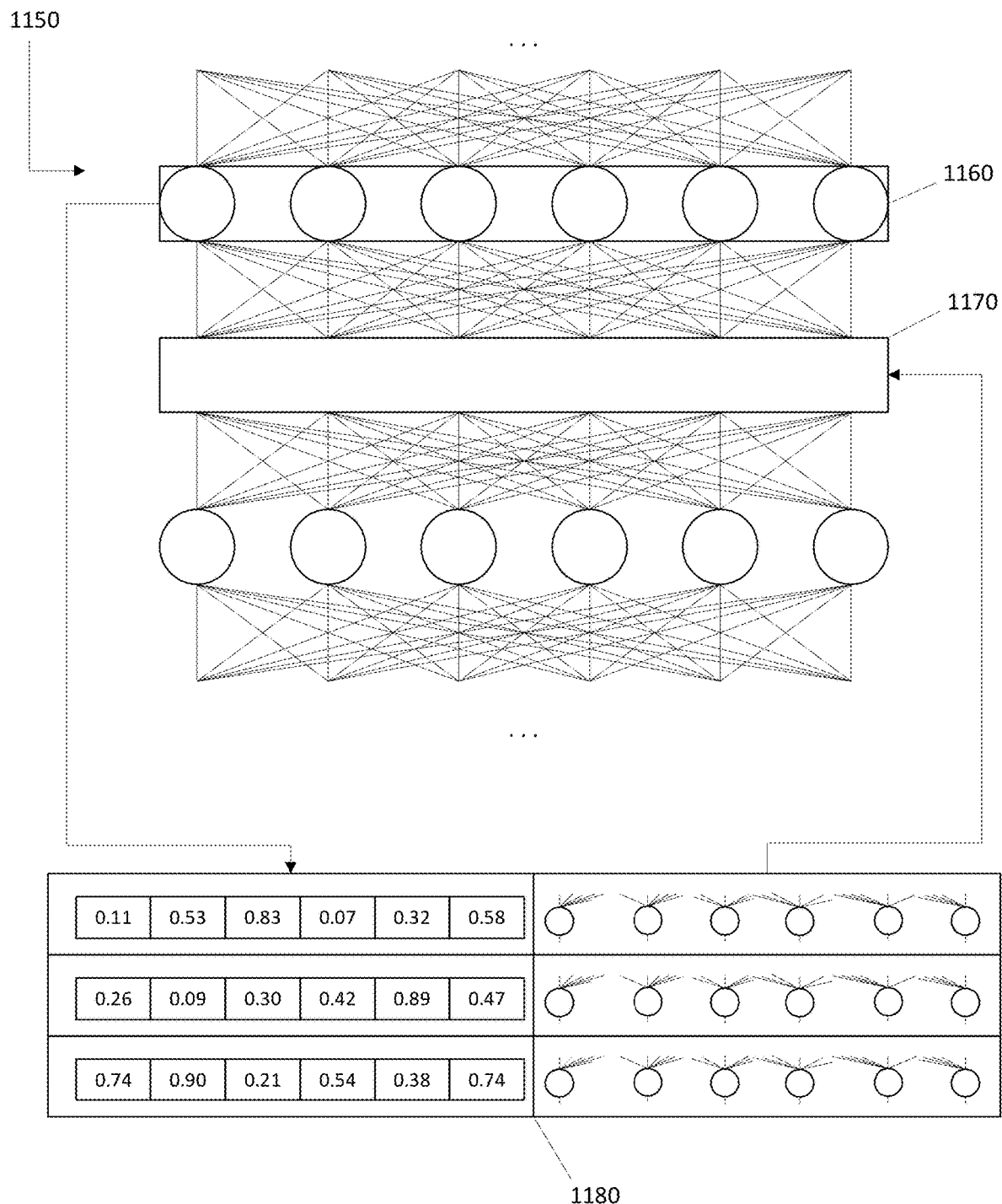

FIGS. 11A-B illustrate an example attention mechanism for a neural network, called "Neural Network Memory," that may be used in end-to-end speech recognition system 200, end-to-end speech classification system 700, end-to-end phoneme recognition system 800, or other neural networks. One problem with neural networks and other machine learning techniques is that the size of the machine learning model constrains the amount of knowledge that can be learned. It is one version of the mathematical pigeon hole principle, which states that if n items are put into m containers, with n>m, then one container must contain more than one item. In the same way, a machine learning model that is trying learn a complex decision boundary on a large amount of data cannot, in general, learn the complex decision boundary exactly if the machine learning model is significantly smaller in size than the amount of data being trained on. As the complexity of the decision boundary exceeds the size of what can be easily expressed in the size of the model, various components of the neural network, such as weights and hidden nodes, become overloaded and must try to learn more than one function, causing the learning rate of the neural network to slow down significantly over time as more training examples are seen. In some cases, the quality of the machine learning model that is learned by the neural network may plateau or even become worse.

Neural Network Memory addresses this problem by creating an expert knowledge store, which is a data store in memory, that stores expert neural network layer portions that may be inserted into the neural network at the right time. In an embodiment, the expert knowledge store is a database. The expert neural network layer portions may be a portion of a neural network layer or an entire neural network layer. The expert neural network layer portions may learn specialized functions that apply in specific conditions and be swapped in and out of the neural network automatically when those conditions are detected.

Example neural network 1100 is a fully-connected neural network with multiple layers of hidden states. Neural network layer portion 1110 is a selector and neural network layer portion 1120 is a gap with no hidden nodes and that is filled by swapping expert neural network layer portions in and out. After an audio file is input to the neural network system, whether for training or inference, forward propagation occurs as normal. When the gap 1120 is reached, forward propagation cannot continue until an expert layer is inserted. In order to select the expert layer, forward propagation occurs through selector neural network layer portion 1110 as normal. The activation outputs of the nodes of the selector neural network layer portion 1110 are used as a query to find the expert neural network layer to insert into gap 1120. Expert knowledge store 1130 stores selectors 1115 that each serve as an index for one expert neural network layer portion 1125 that corresponds to the selector. Each expert neural network layer may comprise the weights for the inbound edges to the nodes of the expert neural network layer and the activation function of the nodes.

In an embodiment, the activation outputs of the nodes of the selector neural network layer portion 1110 are stored in a tensor. The activation outputs are output from the activation function of each node. Each element of the tensor may correspond to one node output. In selector neural network layer portion 1110 there are three nodes, which means that there are three output values stored in the tensor. The tensor of activation outputs is compared with all of the selectors 1115 in the expert knowledge store 1130. In an embodiment, the comparison is performed by using a distance metric. In an embodiment, the distance metric is the cosine similarity between the tensor of activation outputs and a selector 1115. In an embodiment, the distance metric is the dot product between the tensor of activation outputs and a selector 1115. The closest selector 1115 according to the distance metric is chosen as the correct row of the expert knowledge store. The expert neural network layer associated with the closest selector 1115 is then inserted into the neural network 1100 in the gap 1120. After insertion of the expert neural network layer into the gap 1120, forward propagation continues through the neural network 1100 just as if the expert neural network layer were a permanent layer of the neural network 1100. If the neural network 1100 is performing inference, then after neural network 1100 produces its output, the expert neural network layer may be deleted from portion 1120 so that portion 1120 is once again empty and ready to be filled in at the next iteration. If the neural network 1100 is performing training, then training of the expert neural network layer and the selector may be performed. In an embodiment, after forward propagation is completed, the output of the neural network may be compared with the ground-truth output associated with the input. Backpropagation is performed based on the difference between those two values, the ground-truth output and the actual output of the neural network. The backpropagation is performed through the expert neural network layer inserted into gap 1120 just as if the expert neural network layer was a permanent part of neural network 1100 and adjusts the weights of each of the nodes of the expert neural network layer through training. After backpropagation, the updated expert neural network layer is stored back in the expert knowledge store, overwriting the prior version. The backpropagation trains the expert neural network layer to become more accurate, for those conditions where it is inserted in the network, and allows it to become specialized for particular use cases. In addition, the selector associated with the expert neural network layer is trained to become more similar to the tensor of activation outputs from selector neural network layer portion 1110. This process allows the selectors to become specialized to the correct conditions. In an embodiment, the selector is adjusted pointwise to become more similar to the values of the tensor of activation outputs from selector neural network layer portion 1110, such as by reducing the distance between the selector and tensor in vector space. A selector learning rate may be set to control the rate at which selectors are adjusted and may be a scalar value. In an embodiment, the values of the selector are changed by a percentage of the distance between the selector and the tensor of activation outputs multiplied by the selector learning rate. In an embodiment, the values of the selector are changed by a fixed value in the direction of the tensor of activation outputs multiplied by the selector learning rate.

In neural network 1100, the selector neural network layer portion 1110 and gap 1120 for inserting the expert neural network layer are two halves of the same neural network layer. In other embodiments, the relative location of these portions may be different. They can be of different sizes and do not need to be exactly half of a neural network layer. Moreover, the selector neural network layer portion 1110 and the gap 1120 are not required to be in the same layer.

In an embodiment, Neural Network Memory may be used in neural network 1150 where the selector neural network layer 1160 is a full neural network layer and a gap 1170 for insertion for an expert neural network layer is a full neural network layer. The process described with respect to neural network 1100 is the same, except that the expert knowledge store 1180 stores selectors corresponding to activation outputs for an entire layer and the expert neural network layer portions are entire neural network layers. In neural network 1150, the selector neural network layer 1160 directly precedes the portion 1170 for inserting the expert neural network layer. In other embodiments, the selector neural network layer 1160 and the gap 1170 for inserting the expert neural network layer may be in different relative locations.

In one embodiment, Neural Network Memory is used in the first fully-connected layer 203, 703, 803. In an embodiment, Neural Network Memory is used in the second fully-connected layer 205, 705, 805. Although Neural Network Memory has been illustrated in fully-connected neural networks 1100, 1150 it may be used in any other form of neural network, such as CNN layers 202, 702, 802 or RNN layers 204, 704, 804. Moreover, multiple selector neural network layers and gaps for inserting expert neural network layers may exist in the same neural network.

In an embodiment, the size of expert knowledge store 1130, 1180 increases over time as more training examples are seen by the neural network. As more training is performed, more expert neural network layers are expected to be needed to address the pigeon hole principle. In an embodiment, a counter stores the number of training examples that have been run through the neural network. The counter is incremented with each new training example. A threshold, which may be a threshold value or threshold function, defines the points at which the size of the expert knowledge store increases in size. When the counter of training examples exceeds the threshold, one or more new rows are added to the expert knowledge store. Each row includes a selector and an associated expert neural network layer. New selectors and expert neural network layers may be initialized to random values, may be initialized as an average of the rows above it, or may be initialized with values from existing neural network layer portions of the neural network. In an embodiment, the growth rate at which new rows are added to the expert knowledge store 1130, 1180 decreases over time. The growth rate is, for example, the rate at which new expert neural network layers are added to the store. As more training examples are seen, the rate at which new information is learned is expected to decrease because more and more of the variations in the training data will have already been seen. In an embodiment, the growth rate at which rows are added to the expert knowledge store 1130, 1180 is inversely proportional to the total number of training examples ever processed by the neural network.

Neural Network Memory may be used in a variety of machine learning applications and is not limited to use for the application of speech recognition.

Figure 12:
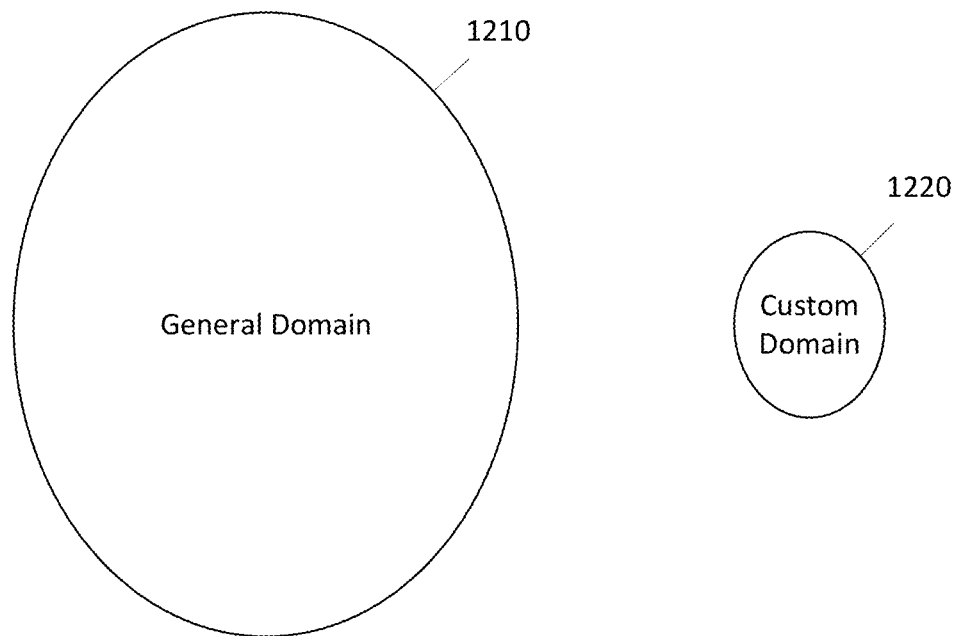
FIG. 12 illustrates an example of a general domain and a custom domain.

FIG. 12 illustrates an example of a general domain 1210 and a custom domain 1220. Neural networks, such as end-to-end speech recognition system 200, end-to-end speech classification system 700, and end-to-end phoneme recognition system 800, may be trained on a general dataset, which trains them to perform in a general domain 1210 for multiple possible applications or situations. In an embodiment, the general domain 1210 is the domain learned by learning across a set of training examples that come from a plurality of different datasets. The different datasets may be aggregated into a general training set. Advantages of training a neural network for a general domain 1210 include the ability to use more training data and also building a model that may work well in multiple situations. However, it may also be desirable to train a neural network, such as end-to-end speech recognition system 200, end-to-end speech classification system 700, and end-to-end phoneme recognition system 800, specifically for a custom domain 1220. A custom domain 1220 may differ from the general domain 1210 in numerous aspects, such as frequencies of words, classifications, and phonemes, audio features (such as background noise, accents, and so on), pronunciations, new words that are present in the custom domain 1220 but unseen in the general domain 1210, and other aspects. The statistical distribution of audio examples in general domain 1210 may differ from the distribution in custom domain 1220. It may be desirable to customize the neural network for the custom domain 1220, which can potentially improve performance significantly in the custom domain 1220. In some embodiments, the custom domain 1220 may include a set of training examples from the custom domain 1220. However, in some embodiments, a training set may not be available for custom domain 1220 and only some information about the distribution in custom domain 1220 may be known, such as a list of frequent words and their frequencies. The neural network trained on the general training set may be referred to as the general model and the neural network customized for the custom domain may be referred to as the custom model.

An example of a custom domain 1220 for speech recognition is performing speech recognition on the phone calls of a particular company. Some words in the custom domain 1220 are likely to have a higher frequency in the domain of phone calls for the company than for general speech recordings. It is likely that the name of the company and names of employees will occur with higher frequency in the custom domain 1220 than in general. Moreover, some words in the custom domain may not exist in a general training set, such as the names of the companies' products or brands.

In the past, customization for custom domain 1220 has been performed by first training a neural network with a general training set to build a general model and then training the neural network on a set of training examples from the custom domain 1220 to customize it. Significant downsides of this approach are that there may not be sufficient data from the custom domain 1220 to customize the neural network by training and that the process of re-training may be slow. Techniques herein address this problem and allows more effective customization of a neural network for a custom domain 1220 more quickly and even when only limited custom training data is available.

Figure 13:
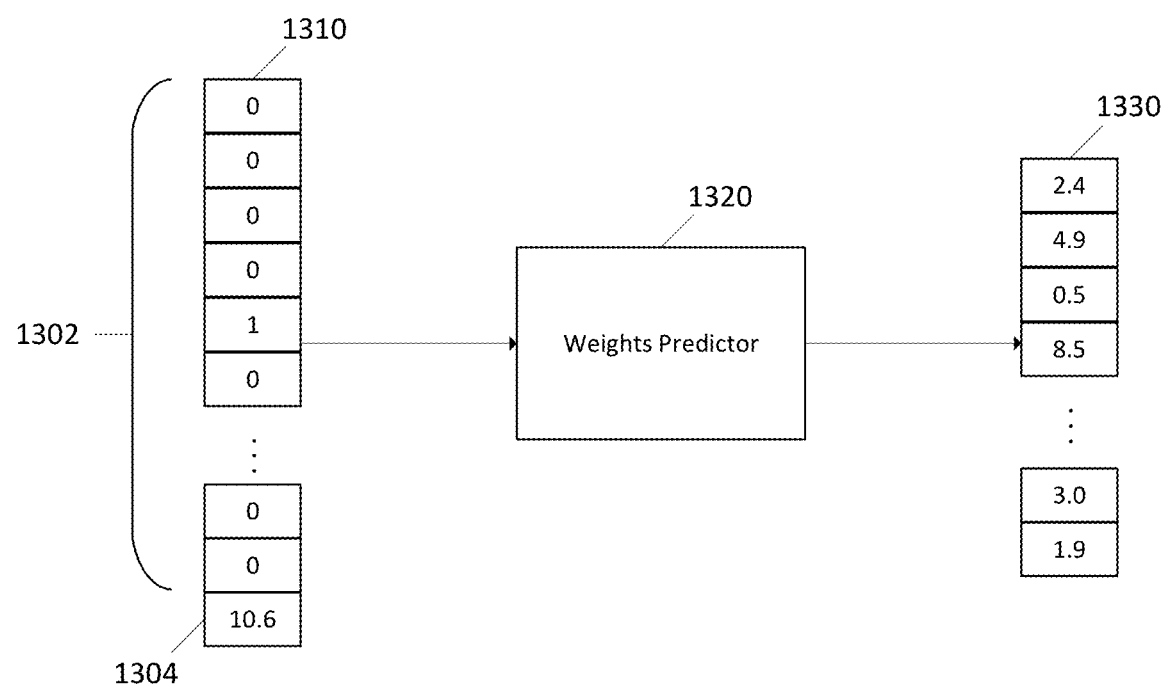
FIG. 13 illustrates an example system for predicting the weights of neural network nodes.

FIG. 13 illustrates an example supervised learning approach for predicting the weights of neural network nodes to improve performance in a custom domain. The predicted weights may be used to replace weights in a neural network that has been trained on a general training set in order to customize the neural network for a custom domain. A machine learning model, separate from the neural network, is trained to predict weights of nodes in the neural network based on phonemes and the frequency of a word. The approach may be used for words that are unseen in the general domain or for words that are seen in the general domain but are more frequent in the custom domain.

In an embodiment, a neural network layer is selected for which new weights will be predicted. In one embodiment, the output layer, such as output layers 206, 706, 806, is selected. The predicted weights will be the weights of the node, which are the weights applied to input values to the node prior to application of the activation function. A weights predictor 1320, which is a machine learning model, is provided. The weights predictor 1320 is trained to predict neural network node weights for a particular word in the vocabulary based on the phonetic representation of the word and its frequency in the general domain. In an embodiment, the weights predictor 1320 is trained by iterating over all of the words of the vocabulary and inputting tensor 1310 comprising the concatenation of a one-hot encoding 1302 of the phonetic representation of the word and the frequency 1304 of the word in the general training set, which may be normalized such as by log normalization, into predictor 1320. The one-hot encoding has zeroes in all positions except for one location having a one representing the phonetic representation of the word. The resulting sparse input vector has two non-zero values, the one-hot encoded location representing the phonetic representation and a value representing the frequency of the word in the general domain. Based on the input vector 1310, the weights predictor 1320 generates output vector 1330 representing the weights for this word in the selected neural network layer. In one embodiment, the predicted weights are the weights for the output node for the word.

In one embodiment, the weights predictor 1320 is linear regression. When using linear regression, the predictor 1320 may be trained using least squares fit. The target value for training examples is the neural network node weights in the general model. Generated values of the predictor 1320 may be compared to the true neural network node weights in the general model and the differences reduced using the least squares method. In one embodiment, the weights predictor 1320 is a neural network, which may have one or more layers. The weights predictor 1320 may be trained using backpropagation. Generated values of the predictor 1320 may be compared to the true neural network node weights in the general model and the weights of the predictor 1320 may be adjusted by backpropagation and gradient descent. The weights predictor 1320 may be other regression models such as polynomial regression, logistic regression, nonlinear regression, and so on.

In an embodiment, a training set is provided for a custom domain. The training set comprises audio files and corresponding text transcripts. Frequent words in the custom dataset that are unseen or have low frequencies in the general training set are identified. In other embodiments, no training set of custom data is provided, but a list of frequent words and their frequencies is provided for their custom domain. For each of the frequent words that are unseen or have low frequencies in the general model, a set of weights is predicted. A one-hot encoding is created for the phonetic representation of the word and the frequency of the word in the custom domain, optionally with normalization such as log normalization, is concatenated to the one-hot encoding. The resulting vector is input into the weights predictor 1320. The output vector provides the predicted weights. The predicted weights are used to replace the weights of the corresponding layer of the neural network in order to customize the neural network for the custom domain. If a word was unseen in the general training set, then a new node is added to the output layer and the weights of the node are initialized to be the predicted weights. In some embodiments, customized weights are predicted for all words in the vocabulary and not just words that occur with high frequency. Optionally, the neural network may be further trained on training examples that come from the custom domain.

In a variation, the input tensor 1310 to weights predictor 1320 also includes bigram information. The bigram information characterizes information about words frequently occurring immediately adjacent to the left or right of the word. In an embodiment, the bigram information may be a vector with one entry per word of the vocabulary and the value at each location represents the probability that the word appears adjacent to the current word. The bigram vector may be concatenated to input tensor 1310. In this variation, the weights predictor 1320 may be trained by computing the bigram information in the general training set for each word of the vocabulary, concatenating that to the input tensors 1310 for each word, and training on all of the words of the vocabulary as described above. During inference, bigram information may collected based on rate of co-occurrence as adjacent words in the custom domain, which may either be provided or be computed from a custom training set. The bigram information is attached to the input tensor 1310 during inference. The predicted output weights are used in the same way as described above.

The technique of predicting neural network node weights, as described herein, may be used in a variety of machine learning applications and is not limited to use for the application of speech recognition.

Figure 14:
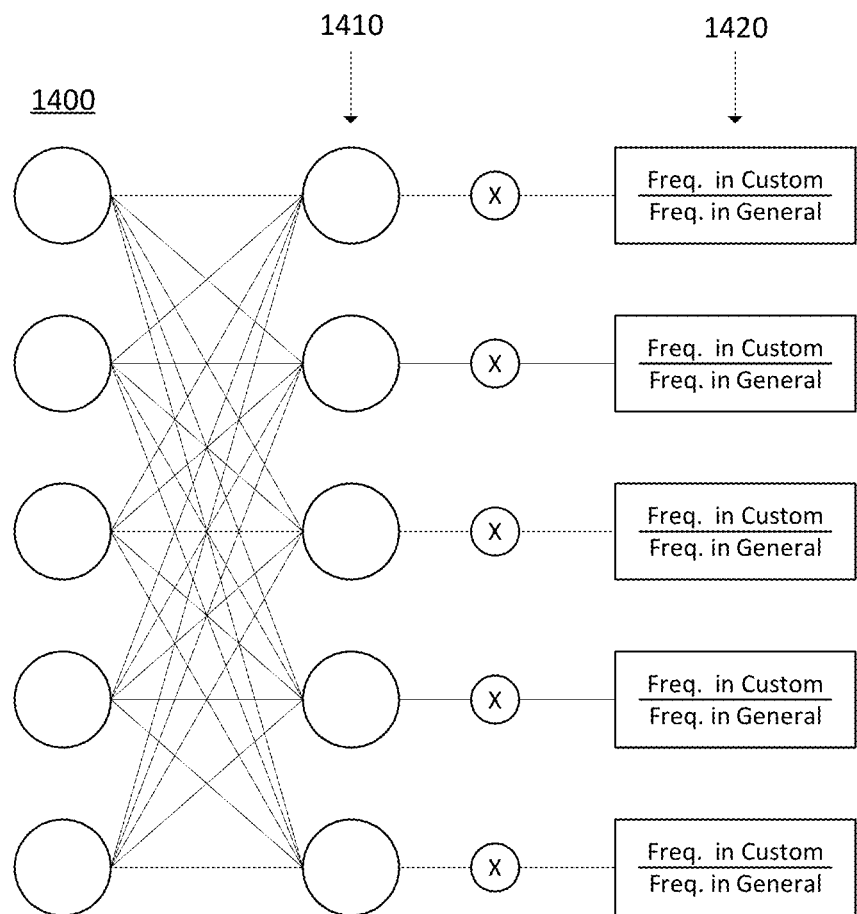
FIG. 14 illustrates an example customization layer of a neural network.

FIG. 14 illustrates an example unsupervised learning approach for customizing a neural network for a custom domain by using a customization layer, such as customization layer 207. As described above, some words may occur with higher frequency or lower frequency in a custom domain than in the general domain. Customization layer 207 may change the probability that words are produced according to these frequencies. For example, the concept of prior probability, also called a prior, refers to the probability of an occurrence before any observations are made. Statistically, the prior probability should be taken into account in the probabilities of words generated by the neural network.

In an embodiment, frequent words in the custom dataset that are unseen or have low frequencies in the general training set are identified. In other embodiments, no training set of custom data is provided, but a list of frequent words and their frequencies is provided for their custom domain. For each of the frequent words that are unseen or have low frequencies in the general model, customization is performed as described below. In other embodiments, customization is performed for all words in the vocabulary regardless of whether they are frequently occurring or not.

In example neural network 1400 an output layer 1410 is provided that outputs the probability that the input corresponds to the associated word represented by the output node. In step 1420, corresponding to customization layer 207, the probabilities are adjusted by dividing by the frequency of the word in the general training set and multiplying by the frequency of the word in the custom training set. The resulting values are used as the new word probabilities, and the word with the highest probability after customization is selected as the output of the neural network. The effect of the customization is, roughly, to remove the prior for the word from the general domain and replace it with the prior for the word from the custom domain.

In an embodiment, the frequency of words in the general training set may be tracked and stored as general training is performed. Words that were unseen in the general training set may be given a small non-zero frequency value to allow the division step to be performed. In some embodiments, the frequency of the words in the custom domain may be provided. In other embodiments, the frequency of words in the custom dataset may be generated by running a custom training set through the general model to obtain a transcription of the custom training set. The frequency of the word may then be determined by parsing the transcription.

In a variation, customization is performed on a per-bigram basis instead of a per-word basis. Bigrams may be formed by combining the current word with the preceding word or succeeding word. The frequency of word bigrams in the general training set is tracked, and the frequency of word bigrams in the custom training set is also determined, using the methods described above. Word probabilities are computed as normal in output layer 1410. In a customization step, the correct bigram is determined based on the combination of the current word with the preceding word or succeeding word as appropriate. The word probability is then divided by the bigram frequency in the general training set and multiplied by the bigram frequency in the custom training set.

The technique of customizing a neural network by using a customization layer, as described herein, may be used in a variety of machine learning applications and is not limited to use with neural networks or for the application of speech recognition.

Figure 15:
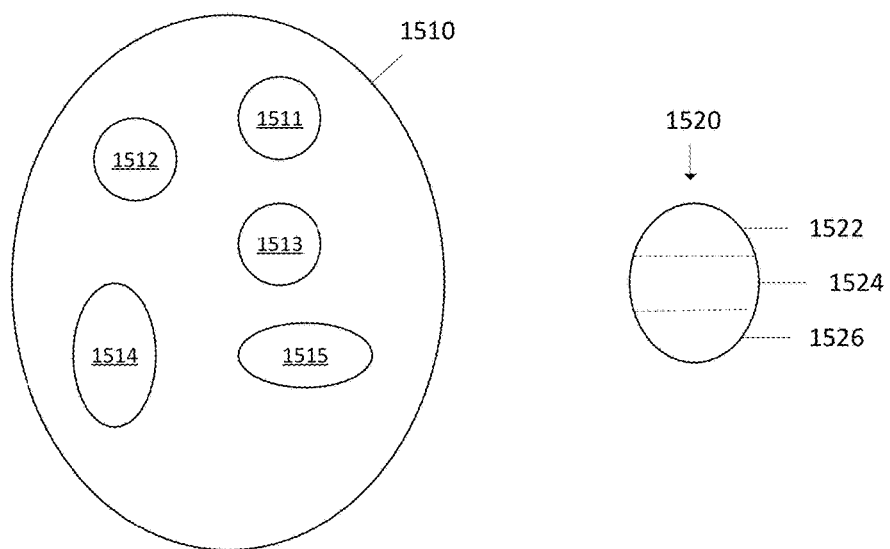

FIG. 15 illustrates an example of dynamically training on a general training set to customize a neural network, such as such as end-to-end speech recognition system 200, end-to-end speech classification system 700, and end-to-end phoneme recognition system 800, for a custom domain. General training set 1510 with audio examples from general domain 1210 and custom training set 1520 with audio examples from custom domain 1220 may be provided. The general training set 1510 may have significantly more data and training samples than custom training set 1520. In an embodiment, the general training set 1510 has tens of thousands, hundreds of thousands, or millions of hours of audio data and the custom training set 1520 has a few hours of audio data or less. Re-training a general model, trained on the general training set 1510, with the custom training set 1520 may not be effective because there may not be enough custom training data to customize the model.

In an embodiment, the general training set 1510 is a collection of training subsets 1511-1515 collected from various sources. Although five training subsets 1511-1515 are illustrated, many more may be used in practice. The training subsets 1511-1515 may have different characteristics, such as source (e.g., public dataset, proprietary inhouse data, data acquired from third parties), types of speakers (e.g., mix of male and female, mix of accents), topics (e.g., news, sports, daily conversation), audio quality (e.g., phone conversations, in-person recordings, speaker phones), and so on. Some training subsets 1511-1515 may be more similar to the examples in custom training set 1520 and others less similar. Each training subset 1511-1515 may have a handle that identifies it.

In a first approach, the entire general training set 1510 is used for training the neural network. However, this approach does not customize the neural network for the custom domain 1220 represented by the custom training set 1520. Instead, in an embodiment, some of the custom training data may be set aside as a custom evaluation subset 1522. Only some of the general training subsets 1511-1515 are used for training and the quality of the results are tested against the custom evaluation subset 1522. The set of general training subsets 1511-1515 used for training may be adjusted to improve performance on the custom evaluation subset 1522. In a second approach, a neural network is trained on general training set 1510 to create a general model and different mixes of general training subsets 1511-1515 are used for further training to customize the neural network. An AB testing approach may be taken with different combinations of general training subsets 1511-1515 tried according to a selection algorithm, which may use randomization, and the quality of the results measured against the custom evaluation subset 1522. The combination of general training subsets 1511-1515 that provides the lowest word error rate (number of words misidentified) on the custom evaluation subset 1522 may be selected as the best combination to use for customization. That combination may be used for additional training of the neural network to customize it for the custom domain 1220. In a third approach, a fully dynamic method is used where the mix of general training subsets 1511-1515 to train on is never finalized because the mix can continue to change over time. The combination of general training subsets is fully dynamic and is chosen in a way balance exploration and exploitation on an ongoing basis. This third approach is described in more detail below.

In an embodiment, a reinforcement learning algorithm is used to dynamically select general training subsets to train on for customization of a neural network. The neural network is initially trained on the general training set 1510 to create a general model. The custom training set 1520 may be divided into three pieces, a custom evaluation subset 1522, a custom validation subset 1524, and a custom training subset 1526. Although the subsets are illustrated as roughly equal in size, they may have varying relative sizes. The reinforcement learning system takes actions, which in this case are selections of a general training subset to train on for a number of training batches, and receives rewards for those actions, which are the word error rate on the custom evaluation subset 1522. A decreased word error rate is a positive reward, and an increased or unchanged word error rate may be a negative reward. The reinforcement learning system may learn a policy for choosing general training subsets to train on in order to improve the word error rate on the custom evaluation subset 1522 and thereby customize the neural network for the custom domain 1220.

In an embodiment, the reinforcement learning system has an agent, actions, environment, state, state transition function, reward function, and policy. In an embodiment, the agent is the customization system that chooses the next general training subset to train on. In an embodiment, the actions are the choice of which general training subset to train on for the next iteration. In an embodiment, the environment is an environment that is affected by the agent's actions and comprises the state, state transition function, and reward function. In an embodiment, the state is the current neural network state, whose weights are determined by the prior training iterations. The state may also include tracked information about the distribution of past rewards for each action (e.g., choice of general action subset) including the expected rewards for each action and tracked information about uncertainty associated with each action, such as how many times each action has been taken. In an embodiment, the state transition function is the function that defines the transition to a new state based on the selected action. The state transition function may be implicitly defined by the act of training the neural network with the selected general training subset to obtain new weights for the neural network. In an embodiment, the reward function is a function determining reward values based on the change in word error rate in the custom evaluation subset 1522 after training with the selected general training subset. In some embodiments, the reward function outputs the percent change in word error rate as the reward. In other embodiments, the reward output by the reward function is a transformed value based on the percent change in word error rate. In an embodiment, the policy is a function for selecting the action to take, what general training subset to choose in the next iteration, based on the current state.

In an embodiment, the reinforcement learning system trains the custom model iteratively. At each iteration, it selects general training subset 1511-1515 to train on. The neural network is trained on the selected general training subset for a number of training batches, where the number of training batches may be configurable. After training, the neural network is tested on the custom evaluation subset 1522. The word error rate in the custom evaluation set 1522 is measured and stored. The reinforcement learning system may update its policy based on the word error rate. The reinforcement learning system then selects the general training subset to train on at the next iteration based on, for example, the distribution of past rewards for each general training subset, expected rewards for each general training subset, uncertainty values associated with each general training subset, and/or the number of times each general training subset has already been trained on. In an embodiment, this process continues indefinitely to iteratively improve the neural network's performance in the custom domain 1220. The training policy of the reinforcement learning system may be continuously adjusted based on rewards and need not ever reach a "final" policy.

A multi-armed bandit algorithm, referred to as a bandit algorithm, is one example of a reinforcement learning system. The multi-armed bandit algorithm provides a policy of which actions to take, where the actions provide differing rewards and the distribution of rewards for each action is not known. The multi-armed bandit problem, addressed by the bandit algorithm, is deciding which action to take at each iteration to balance exploration, that is learning which actions are the best, with exploitation, that is taking advantage of the best action to maximize the total rewards over time. The multi-armed bandit problem takes its name from a hypothetical problem of choosing which of a set of slot machines to play, where the slot machines pay out at different, unknown rates. In an embodiment, a bandit algorithm may be used where the actions for the bandit algorithm are the choice of which general training subset to train on and the rewards for the bandit training algorithm are the change in word error rate on the custom evaluation set 1522 or a function based on that value. The bandit algorithm iteratively chooses general training subsets to train on according to a policy that balances exploration and exploitation. The bandit algorithm may run indefinitely and continuously and dynamically update its policy on an ongoing basis, never stopping at a "final" policy.

In an embodiment, a bandit algorithm is used to iteratively select general training subsets to train on to customize a neural network for a custom domain 1220. In one embodiment, the bandit algorithm has a scoring function, and the bandit algorithm's policy is to select the general training subset that has the highest score according to the scoring function. The value of the scoring function may be based on the distribution of past rewards for each general training subset, expected rewards for each general training subset, uncertainty values associated with each general training subset, and/or the number of times each general training subset has already been trained on. In one embodiment, the value of the scoring function increases with the mean reward observed for the general training subset and decreases with the number of times the general training subset has been chosen. In an embodiment, an uncertainty value is stored for each general training subset and increases over time when the subset is not chosen. The value of the scoring function may increase with increases in the uncertainty value of the general training subset. Use of uncertainty values models the uncertainty produced by the non-stationary rewards of this bandit problem. The distribution of rewards from the general training subsets is not fixed over time because the neural network weights are changing as it is trained and so the effect of each general training subset on the neural network will also change. A bandit problem with non-stationary rewards may be referred to as a non-stationary bandit problem and a bandit algorithm configured for addressing a non-stationary bandit problem may be referred to as a non-stationary bandit algorithm.

In an embodiment, at each iteration, the bandit algorithm selects a general training subset to train on by applying the scoring function to each subset and choosing the highest scoring one. The neural network is trained on the selected general training subset for a number of training batches, where the number of training batches may be configurable. After training, the neural network is tested on the custom evaluation subset 1522. The word error rate in the custom evaluation set 1522 is measured and stored. The word error rate corresponds to a reward, with reductions in word error rate corresponding to a positive reward and increases in word error rate corresponding to a negative reward, or penalty. Stored information about the distribution of rewards and mean reward for this general training subset may be updated based on the observed word error rate. A counter of the number of times the general training subset was trained on may be incremented. An uncertainty value associated with the selected general training subset may be decreased, and the uncertainty values associated with all other general training subsets, which were not chosen, may be increased. The next iteration then begins with the bandit algorithm selecting the next general training subset to train on. The process may continue indefinitely to iteratively improve the neural network's performance in the custom domain 1220. No final "best" mix of general training subsets is chosen, rather the bandit algorithm continues to select the general training subsets based on information about the past rewards observed and its measures for uncertainty regarding each subset.

The bandit algorithm may be the upper confidence bound (UCB) algorithm, the UCB1 algorithm, the epsilon greedy algorithm, or other bandit algorithms. In one embodiment, the scoring function for the bandit algorithm is given by $$UCB_{i,t} := \hat{\mu}_{i,t} + \sqrt{\frac{\ln t}{n_{i,t}}}$$

where i is the index or handle of the general training subset, t is the iteration number, and $$\hat{\mu}_{i,t} = \frac{\sum_{S=1:I_S=i}^{t} r_S}{n_{i,t}}$$

the mean reward observed for the general training subset in past iterations. In the aforementioned equation, the $I_S$ term is the choice of general training subset at time t. As seen from the equation, the exemplary scoring function has one term that is the expected reward for the general training subset and one term that is inversely related to the number of times that the general training subset has been chosen, and the two terms are combined by addition. In a variation, the UCB1 algorithm uses the related scoring function $$UCB1_{i,t} := \hat{\mu}_{i,t} + \sqrt{\frac{2 \log t}{n_{i,t}}}.$$

In other embodiments, other scoring functions may be used. In an embodiment, the bandit algorithm may initially iterate through the general training subsets and train on each of them once, and then switch to choosing the general training subset through the scoring function.

As described above, a reinforcement learning system may be used to select general training subsets to train on to condition a neural network for a custom domain. One reinforcement learning system is implemented with a bandit algorithm. Optionally, a portion of custom training set 1520 may be reserved as a custom training subset 1526 to further condition the neural network. The neural network may be trained on the custom training subset 1526 in the usual manner, by inputting the values, comparing the outputs to ground-truth results, and adjusting the neural network node weights with backpropagation. Moreover, a custom validation subset 1524 may be used for validation to independently test the quality of the custom model after it has been customized using the reinforcement learning system or bandit algorithm and optional custom training subset 1526. Validation may be performed by testing the performance of the neural network on custom validation subset 1524 on word error rate or other measures.

The use of reinforcement learning and/or bandit algorithms for selecting general training subsets to train on and customize for a custom domain, as described herein, may be used in a variety of machine learning applications and is not limited to use with neural networks or for the application of speech recognition.

Figure 16:
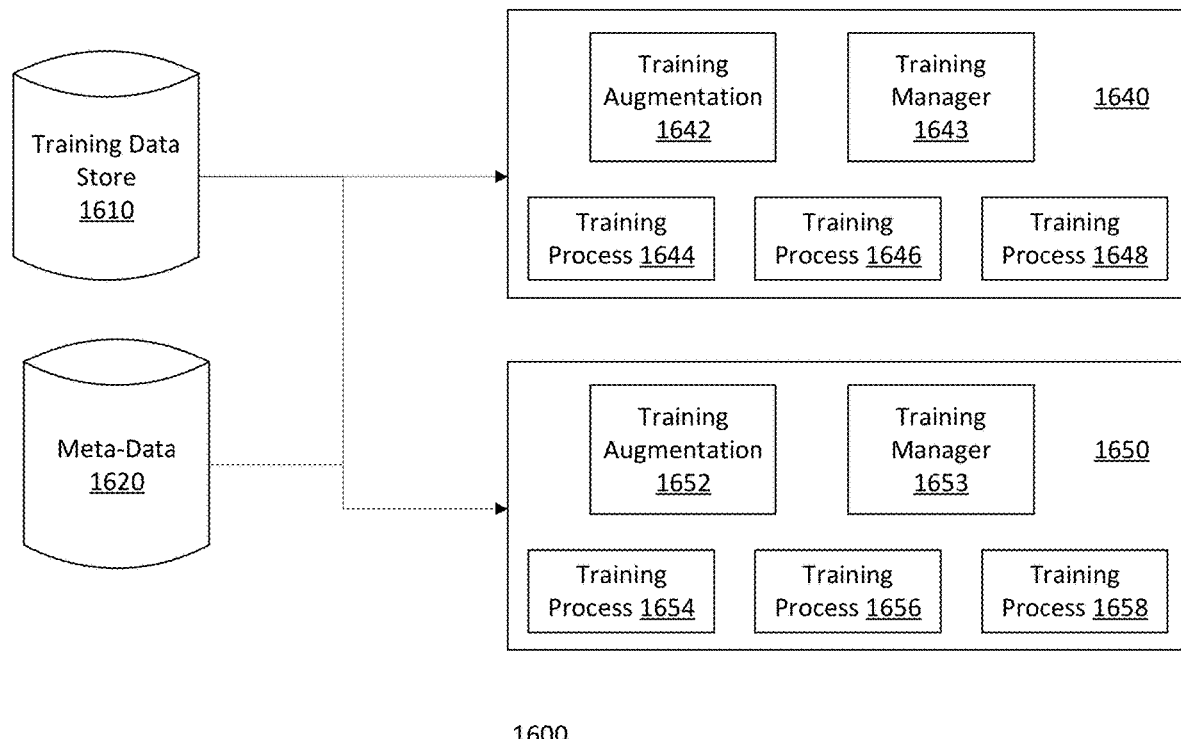
FIG. 16 illustrates an example training data augmentation and streaming system.

FIG. 16 illustrates an example training data augmentation and streaming system 1600 according to an embodiment. In some embodiments, it is valuable to augment existing training data by applying one or more augmentations to the data. Augmentations may also be referred to as "effects." The augmentations expand the dataset to provide more data with more variety and can increase the robustness of the learned model. In traditional systems, augmentations are difficult to perform because the number of different combinations of potential augmentations can be combinatorially large. The training dataset itself may already be large and additionally storing all of the augmented versions of the dataset may not be feasible due to the large amount of memory it would occupy. To address this problem, the training data augmentation and streaming system 1600 provides training data augmentation as a service through an Application Programming Interface (API). The system 1600 provides a service that generates augmented training data just-in-time when it is requested by a training process.

In the system 1600, training data store 1610 stores training data in the form of audio files or other data. In an embodiment, the training data store 1610 comprises one or more Redundant Array of Redundant Disk (RAID) arrays, which provide fault tolerance. Meta-data store 1620 stores meta-data about the training data sets. It may store information about the name and source of the training data sets and associate names to handles and locations in the training data store 1610. Computer servers 1640, 1650 perform the processing necessary to train a machine learning model, such as the neural networks discussed herein. Training processes 1644, 1646, 1648, 1654, 1656, 1658 perform training of a neural network such as by accepting training data, performing forward propagation through a neural network, and performing backpropagation based on the results. The training processes may be training the same single neural network in parallel or may be training different neural networks. Training manager 1643 manages the training processes on server 1640, and training manager 1653 manages the training processes on server 1650. Training data augmentation system 1642 provides training data augmentation service to the training processes 1644, 1646, and 1648. In an embodiment, the training processes 1644, 1646, and 1648 communicate with the training data augmentation system 1642 through an API. In an embodiment, the API is implemented with UNIX sockets. Training data augmentation system 1652 provides training data augmentation service to the training processes 1654, 1656, and 1658. In an embodiment, the connection between servers 1640, 1650 and the training data store 1610 and meta-data store 1620 is implemented over the Network File System (NFS).

An embodiment will be described with respect to training data augmentation system 1642, and training data augmentation system 1652 operates in the same manner. Training data augmentation system 1642 waits for a training process 1644 to connect to it using an API call. The training process 1644 connects to the training data augmentation system 1642, and training process 1644 transmits via an API call an indication of the training dataset that it wants to train on and which augmentations it desires to be applied. The indication of the training dataset may be provided in the form of a handle. In an embodiment, the augmentations provided may be reverb, with a selection of kernels; noise from varying noise profiles; background tracks, such as for emulation of background speaking; pitch shifting; tempo shifting; and compression artifacts for any of one or more compression algorithms. The training augmentation system 1642 accesses the meta-data store using the provided handle to identify the location of the requested training data in the training data store 1610. Training augmentation system 1642 then accesses the training data store 1610 at the identified location to download the requested training data through a streaming process. Streaming provides the data in a continuous flow and allows the data to be processed by the training augmentation system 1642 even before an entire file is downloaded. As portions of the training data are downloaded from the training data store 1610, the training augmentation system 1642 buffers it in the memory of the server 1640. Training data augmentation system 1642 monitors the streaming download to determine if sufficient data has been downloaded to begin training. Training data augmentation system 1642 determines when the amount of data downloaded exceeds a threshold to determine when to begin training. Training may begin before the entire training dataset is downloaded, by training using the buffered portions. Once sufficient training data is buffered on the server 1640, the training data augmentation system 1642 applies the requested augmentations to the buffered data. It sends the augmented training data as a stream to the training process 1644. The training data augmentation system 1642 continues to stream additional training data from the training data store 1610. As this data is buffered on server 1640, training data augmentation system 1642 applies the requested augmentations to the data and streams it to the training process 1644. The training data augmentation system 1642 receiving streaming training data from the training data store 1610, applying augmentations to other buffered training data at the training data augmentation system 1642, and transmitting streaming augmented training data to the training process 1644 may occur concurrently and in parallel. After the training process 1644 has completed training on the augmented version of the data, the augmented stream of data is deleted. In an embodiment, portions of the augmented stream of training data are deleted as soon as the training process 1644 completes training on the portion, and even when streaming of the remainder of the augmented training data from the same training dataset to the training process 1644 continues.

The buffered, un-augmented training dataset downloaded from the training data store 1610 to server 1640 may be stored temporarily or permanently on server 1640 to provide caching. When training process 1646 requests to train on the same training data, the training data augmentation system 1642 may check the cache to see if the training dataset is already buffered in local memory of the server 1640. If the training dataset is already present, the training data augmentation system may use the cached version of the training dataset, instead of fetching the training dataset from the training data store 1610. If the training dataset is not in the cache, then the training data augmentation system 1642 may initiate a fetch of the training dataset from the training data store 1610.

In an embodiment, the training datasets are stored as audio files. Training data augmentation system 1642 may optionally perform preprocessing on the training data before applying augmentations. In an embodiment, training data augmentation system 1642 performs the functionality of front-end module 201, 701, or 801. In one embodiment, the training data augmentation system 1642 decompresses the audio files and performs feature extraction to generate features. The training data augmentation system 1642 may provide the feature data and the corresponding text transcripts for the training audio files to the training processes. In one embodiment, the training processes may access the training data augmentation system 1642 through the training manager 1643.

Training data augmentation and streaming system 1600 may be used in a variety of machine learning applications and is not limited to use with neural networks or for the application of speech recognition.

Figure 17:
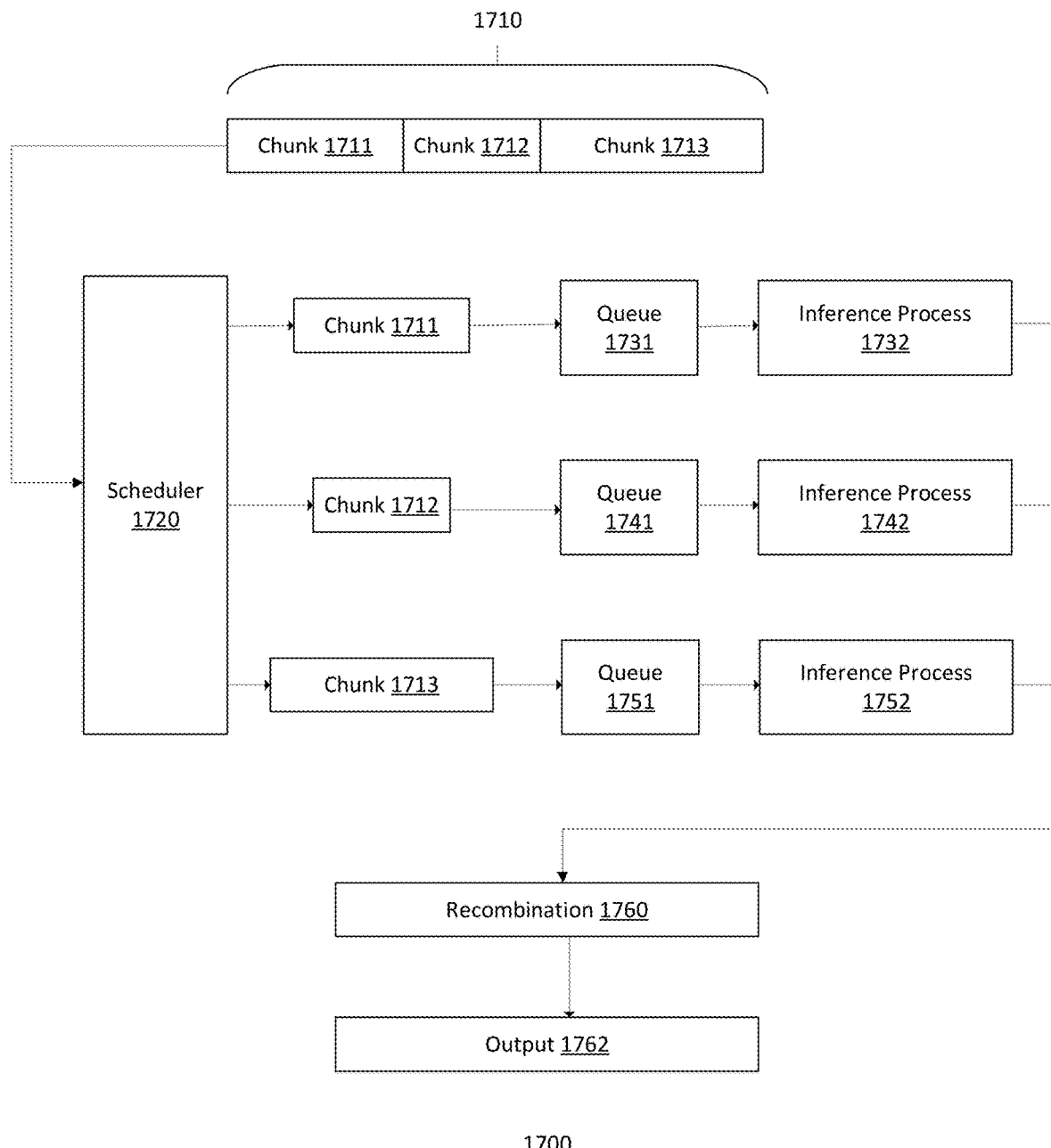
FIG. 17 illustrates an example process for parallelizing an inference task.

FIG. 17 illustrates example process 1700 for massively parallelizing the inference processing using neural networks, such as end-to-end speech recognition system 200, end-to-end speech classification system 700, or end-to-end phoneme recognition system 800. Traditional ASR systems do not parallelize well, which may lead to performance difficulties in production systems with many requests. For example, the Hidden Markov Models and Gaussian Mixture Models coupled to language models, as used in traditional ASR, are typically not easy to parallelize. On the other hand, neural networks are well-suited to parallelization, leading to significant advantages for end-to-end neural network systems.

In example process 1700, a client process submits an audio file 1710 for transcription. This inference task may be transmitted from the client process over a network to a server hosting the end-to-end speech recognition system 200. A server process identifies locations, which may be identified by timestamps, where the audio file can be split. In an embodiment, the server process identifies splitting locations by identifying low-energy points in the audio file, such as locations of relative silence. In an embodiment, the low-energy points are determined by applying a convolutional filter. In another embodiment, a neural network is trained to learn a convolutional filter that identifies desirable locations in the audio file to split at. The neural network may be trained by providing training examples of audio files and ground-truth timestamps where the audio files were split. The neural network may learn a convolutional filter for determining splitting locations through backpropagation. In an embodiment, the split portions of the audio file may be approximately 7-10 seconds in length.

The audio file 1710 is split into portions 1711, 1712, 1713. The portions may be referred to as chunks. Although three chunks are illustrated, the audio file 1710 may be split into more or fewer chunks. The server process applies an index to each chunk to preserve an indication of their order so that the chunks may be reassembled after inference. In an embodiment, the index stored is a timestamp of the temporal location of the chunk in the audio file, such as a starting timestamp, ending timestamp, or both.

The chunks 1711, 1712, 1713 are routed to a scheduler 1720, which assigns each chunk to a GPU for performing the inference to determine the transcription. The scheduler 1720 may dynamically assign chunks to GPUs based on characteristics of the GPUs and the chunks. The scheduler 1720 may assign chunks based on how busy GPUs are, the size of the GPU's queue of waiting tasks, the processing power of the GPUs, the size of the chunks, and other characteristics.

GPUs perform inference processes 1732, 1742, 1752 for end-to-end speech recognition, end-to-end speech classification, end-to-end phoneme recognition, or other inference tasks. Each GPU maintains a queue, 1731, 1741, 1751 of waiting jobs. A scheduling protocol determines when each GPU begins processing the chunks in its queue. In embodiment, there is a separate scheduler per GPU to assign the GPU to start processing the tasks in its queue. In another embodiment, the central scheduler 1720 performs this task for all of the GPUs. The GPUs perform their inference tasks in parallel to each other, thereby allowing massive speedups by converting a single inference task into a set of parallel inference tasks.

In an embodiment, the scheduling protocol for determining when the GPU begins processing a training batch in its queue is dynamic. The GPU begins processing a batch when the batch in the queue reaches a target batch size. The GPU compares the target batch size with the number of tasks in its queue, or their aggregate size in memory, to determine when to begin processing. In an embodiment, the target batch size starts at the maximum size that fits in the GPU memory. The scheduling protocol also maintains a time out, and the GPU begins processing the batch in its queue if the time out is reached, even if the target batch size is not met. After the GPU finishes processing the batch, if there are tasks left in the queue, then the scheduling protocol sets the target batch size to the number of tasks in the queue. However, if no tasks are left in the queue, then the scheduling protocol sets the target batch size to the maximum size that fits in the GPU memory.

The inference processes 1732, 1742, 1752 may produce inference results, such as transcriptions of the audio chunks 1711, 1712, 1713. The inference results and chunks may be provided to recombination process 1760. The transcribed text is stitched back together, such as by concatenation, into a single output based on their indices, which may be timestamps. The recombination process 1760 orders the transcribed text in the correct temporal arrangement based on the value of the indices of their corresponding audio chunks in order to produce final output 1762, which is a transcription of the entire audio input 1710.

The technique of chunking an input file and dynamically scheduling the chunks for processing by GPUs may be used in a variety of machine learning applications and is not limited to use with neural networks or for the application of speech recognition.

A trained neural network such as disclosed above may be used for purposes in addition to speech recognition. For example, the internal state of a trained neural network may be used for characterizing speech audio or deriving an internal state representation of the speech audio.

In an embodiment, an internal state representation is determined based on the internal state of a trained speech recognition neural network while transcribing a speech audio sample. The internal state representation is a concise representation of the internal state of the trained neural network while processing the audio input. The total internal state of a trained neural network may be very large—on the order of hundreds of megabytes of data to describe the entire internal state. In some embodiments, the internal state representation obtained by sampling or compressing the total internal state may be significantly smaller, on the order of hundreds of bytes of data. In an example, an internal state representation may be 256 bytes derived from an internal state of approximately 300 MB.

The internal state representation may be recorded at the time of initial transcription by a trained neural network and stored alongside the original audio. The internal state representations may be associated with the particular frames or timestamps of the original audio that produced them. Then, at a later time, various discrimination tasks or search tasks may be performed on the original audio by way of the stored internal state representations without needing to run the original audio through a full end-to-end transcription or classification neural network model a second time. That is, many applications in audio classification or search may be performed on the stored audio without processing the original audio with a potentially computationally-intensive speech recognition or classification neural network a second time. The work performed by the initial speech recognition may be leveraged by any future processing of the audio that would otherwise potentially require a computationally intensive process.

The types of tasks that may use this stored internal state representation include classification and search tasks. For example, a classification task may be to determine when speakers in an audio segment change, sometimes referred to as speaker diarization. Another example of speech classification may be, for example, to determine a mood, sentiment, accent, or any other quality or feature of the speech audio. A search task may be, for example, to search a corpus of speech audio based on an input segment of speech audio or an input text string. One search task may be, for example, to find segments of audio in the corpus that discuss similar topics as the input speech segment. Another search task may be, for example, to find segments of audio in the corpus that are spoken by the same speaker as the input speech segment, or for speakers with similar speech patterns as the input.

Depending on the particular implementation, some embodiments may characterize speech audio according to the acoustic content of the speech audio or the semantic content of the speech audio. For example, an embodiment may relate to deriving a representation of speech audio that is related to the acoustic content of the speech audio. For example, segments of audio with the same person speaking would have similar representations, while segments of audio with a second person would have a distinct representation. This acoustic representation may be used to, for example, search a corpus of acoustic audio data for particular sounds or acoustic signatures. An application of searching for sounds or acoustic signatures is speaker diarization, for example.

In some embodiments, a representation of speech audio may be designed to be primarily related to the conceptual content of the speech audio, or the semantic meaning contained therein. For example, segments of speech audio of different people talking about the same subject matter would have similar representations.

In some embodiments, a mixture of acoustic and semantic meaning may be contained in a representation. Various portions of the representation may be more or less responsive to either acoustic or semantic information from the original speech audio. Such a combined representation may be used in both semantic and acoustic discrimination tasks.

Several different embodiments illustrate varying approaches and techniques used to select and determine the internal state representation. In some embodiments, a particular segment or slice of a neural network may be selected and summarized or compressed to produce the internal state representation. In an embodiment, a portion of a neural network is selected, such as a selection of internal states such as a whole layer, certain portions of a layer, several layers, or portions of several layers. Given this portion of the neural network, a set of low-precision features is derived.

One method of deriving a low-precision feature is to quantize the output of an activation function of a node of a neural network. For example, in an embodiment, the output of the activation function at each node of the portion may be simplified into a binary representation. That is, any output of the node above a threshold is treated as a first binary value, and any output of the node below the threshold is treated as a second binary value. This low-precision representation may be more resilient to minor changes in the input because similar values may quantize to the same value. Other quantization levels may similarly be used, providing a tradeoff between resultant size of the internal state representation and resolution, among other factors. For example, some embodiments may quantize activation functions into four or eight states. Quantization may be performed by selecting n−1 thresholds to create a set of n bins where n is the number of quantized states. The real number valued output of the node is binned based on which pair of thresholds the real number valued output falls between and a numerical index of the bin may be used as the quantized value.

Figure 18:
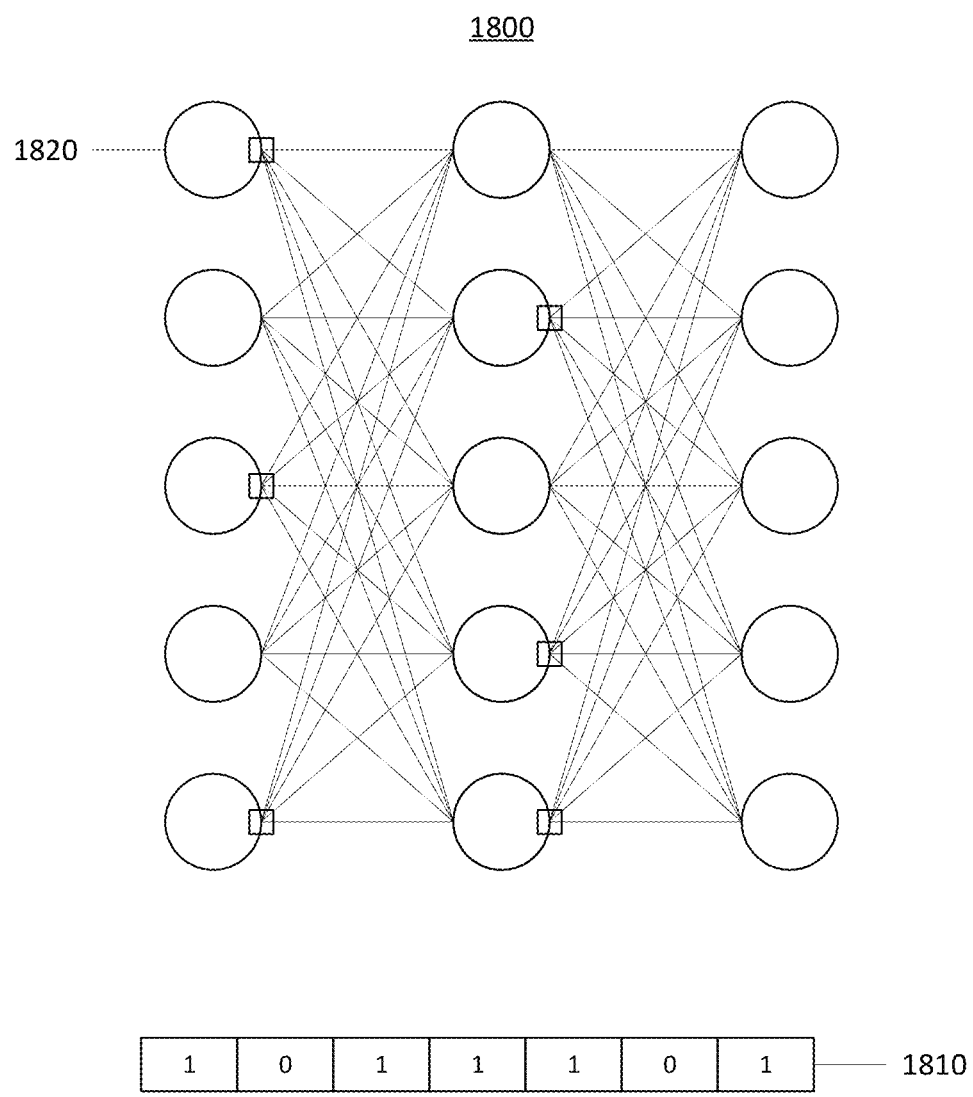
FIG. 18 illustrates an example method of generating an internal state representation of a neural network.

FIG. 18 illustrates an example of the process of generating low-precision features. Neural network 1800 is provided and a subset of nodes of the neural network 1800 are selected for generating the features. As shown, nodes may be in the same layer or different layers of a neural network. During the inference process to transcribe audio, the output of the activation function of each node in the subset of nodes is recorded, as shown for node 1820 and other nodes. The outputs are real number values (such as floating point or double precision), but, in an embodiment, are quantized to binary numbers by use of a threshold, such as 0.5. The quantized values are stored in tensor 1810, where each node corresponds to a fixed location in the tensor 1810. The tensor 1810 provides a compressed representation of internal state of the neural network 1800 during the inference process.

In some embodiments, a whole layer of the neural network may be selected for the internal state representation. In an example, an internal state representation may be determined from a fully-connected stack that produces a word embedding of the input speech audio. For example, the internal state representation may be determined from second fully-connected stack 205 of the example neural network discussed above. This internal state may provide features that relate to semantic meaning of the speech audio, for example.

In an embodiment, an internal state representation may be generated from a CNN layer. Such an internal state may contain features related to the acoustic input or acoustic signature of the input speech audio, for example. For example, an internal state representation may be generated from CNN stack 202 of the example neural network discussed above. In one example, a low-precision feature may be created from the internal state of a CNN layer, or from each non-linearity at the output of a CNN layer. In an embodiment, an internal state representation may be derived from a fully-connected layer that accepts the inputs of a CNN layer, such as first fully-connected layer 203 in the example embodiment discussed above.

In some embodiments, a mixture of nodes from disparate portions of an internal state of a neural network may be selected for the internal state representation. These selections may include portions of the network from any layer, such that they encompass a range of information contained in the network. For example, an internal state representation may be derived from some nodes from a CNN layer, other nodes from an RNN layer, and other nodes from one or more fully-connected layers, such that the resultant representation contains information from each of these various layers.

In one embodiment, a selection of which nodes to include in the internal state representation may be produced through a pruning process. For example, a portion of the internal state of a neural network may be set to a null value, and the effect on the output observed. If the output experiences a large change, the portion that was omitted may be of interest for inclusion in an internal state representation. This process may be automated and iterative such that a pruning algorithm may determine an optimal subset of nodes for inclusion in an internal state representation by observing and learning their effect on the change of the output. Similarly, an approach based on principal component analysis may be used to determine an optimal subset of neural network nodes for inclusion in an internal state representation.

In some embodiments, the architecture of the neural network may be designed to produce an internal state representation. For example, in an embodiment, a neural network may include a fully-connected layer of a comparatively low dimension for the purposes of deriving an internal state representation. This layer may be referred to as a bottleneck feature layer. The bottleneck feature layer is trained in the initial training of the speech recognition neural network to contain all information necessary to produce the output because all information must necessarily flow through the bottleneck layer. In this way, the initial training of the speech recognition neural network model also trains an optimal layer from which a reduced precision internal state representation may be derived.

In another example, a separate branch or branches of the neural network may be appended to or branched from the speech recognition neural network model and initially trained in parallel with the speech recognition portion. That is, additional outputs are added to the neural network with additional loss functions that train the network to produce a separate output that may be used to produce the internal state representation. This technique is similar to the above bottleneck feature technique, but the output may be separately trained from the speech recognition output. Then, the neural network may produce two sets of outputs including a first output that produces speech transcriptions and a second output that produces a representation of the input that may be used for future processing.

In some embodiments, this additional network may be an auto-encoder network that is trained to produce an output similar to the input. That is, the auto-encoder is trained alongside the speech recognition neural network with the state of the speech recognition network as an input and the input to the speech recognition network as the training data. Then, the auto-encoder network will learn an output representation most similar to the input. This type of auto-encoder network may then be used to, for example, generate an approximation of the original acoustic input to the speech recognition network based on the low-precision internal state representation.

Other configurations of additional encoding networks may be used to produce the internal state representation. For example, an encoding network may be trained to encode a particular layer or layers of the original speech recognition network, such as a word embedding layer or an audio features layer. In some embodiments, a combination of such encoders may be jointly used to produce the internal state representation.

Once the internal state representation is determined, by any method described above, it may be used for future processing tasks. For example, in some embodiments, the internal state representation may be used to classify audio. A corpus of audio may be transcribed by an end-to-end speech recognition neural network such as described above. During the initial transcription, an internal state representation may be generated and recorded along with the audio and the corresponding transcription. The internal state representation may contain more information than the corresponding text transcription, but less than the entire internal state of the neural network at the time of transcription. This internal state representation may then be used later to perform novel classification on the original audio data while leveraging the work done previously during transcription. For example, the internal state representation may be used to determine speaker changes in audio, also known as speaker diarization.

In an embodiment, a corpus of audio has been transcribed with an end-to-end neural network. The original audio, the transcription produced by the end-to-end neural network, and a stream of internal state representations created during transcription are stored together. At a later time, a second machine learning model may be trained based on a portion of the corpus that has been manually classified. The manually classified portion of the corpus is used as training data for the second machine learning model. For example, in a speaker diarization embodiment, the manually classified training data may indicate when speakers change in the audio. The indications may be an indication of an identity, or label, of a specific speaker that is talking or just an indication that a speaker change occurred. The second machine learning model may then be trained based on the internal state representation stream and the training speaker diarization indications. The internal state representation stream is provided as input to the second machine learning model and the training speaker diarization indications are provided as the target output. The second machine learning model may then learn to recognize speaker diarization based on the internal state representation stream. It learns a model for identifying internal state representations corresponding to a speaker change, or a certain speaker identity, and identifying internal state representations not corresponding to a speaker change, or other speaker identities. The rest of the corpus of transcribed audio, which lack manual classifications, may then be classified by the second machine learning model based on the previously stored internal state representation stream. The internal state representations corresponding to the non-manually classified audio are input to the second machine learning model. Predicted classifications of the internal state representations are output by the second machine learning model based on the input internal state representations. The predicted classifications may then be matched to the corresponding audio portions or transcription portions associated with those input internal state representations. In this way, the previously computed internal state representation stream may be leveraged by later processing.

Other such classification tasks may be performed on the internal state representation. For example, some embodiments may classify the audio into classes such as gender (e.g., male/female), emotion or sentiment (e.g., angry, sad, happy, etc.), speaker identification (i.e., which user is speaking), speaker age, speaker stress or strain, or other such classifications. Because the internal state representation already contains a complex representation of the speech audio, each of these tasks that may done much more efficiently based on the internal state representation as compared to running a new neural network on the original speech audio.

In some embodiments, the internal state representation stream may be used for search tasks. For example, rather than searching on transcribed text, a search of a speech audio file may be performed on the internal state representations associated with the speech audio. Because the internal state representations contain more information than text alone, including acoustic and semantic, a search may find more relevant audio segments than one based on only the output text representation of the speech audio.

In an embodiment, a large corpus of speech audio has been transcribed by a speech recognition neural network such as described above, and an internal state representation derived at the time of the original transcription stored along with the speech audio. A second neural network may then be trained to produce an internal state representation based on a text input. That is, the network accepts as input the text of a word or phrase and produces an internal state representation such as would have been produced by the speech recognition neural network if the word or phrase was present in audio provided to the speech recognition neural network. This second neural network may be trained on the existing data, that is, the corpus of speech audio containing both computed internal state representations and associated text outputs. During training, the second neural network is provided with training examples, where the training examples include an input comprising a text word or phrase and a target output comprising an internal state representation created by the speech recognition neural network when an audio recording of the word or phrase was presented. The second neural network learns a model for producing synthetic internal state representations based on text words or phrases. During a search, an input text word or phrase is presented and input to the second neural network, and an internal state representation is produced by the second neural network for the input word or phrase. This produced state representation is a close approximation of what the speech recognition network would have produced if it had been provided audio input that produced the text that was input to the second network. This state representation may then be used as a search input vector. The search input vector is compared to those internal state representation vectors stored in the corpus for similarity to find matches and search results.

Any method of comparing the representations, which may be expressed as vectors, may be used. For example, a dot product vector similarity or cosine similarity may be used to determine a relationship between the search input and the stored internal state representations. Dot product or cosine similarity are examples of vector or tensor distance metrics to measure similarity. The audio associated with the store internal state representations with the closest matches is the result of the search. In some embodiments, a single search result is returned corresponding to the closest match, and, in other embodiments, a plurality of results are returned.

In an embodiment, a classifier may be used to determine similarity between search input vectors and stored internal state vectors. That is, rather than using a dot product or cosine similarity, a measure of similarity may be determined by training a classifier network on search results. This classifier may be a neural network or may be any other classifier such as a support vector machine or a Bayesian network, for example. The classifier may be trained on ground-truth labelled search results, for example. It may accept training examples comprising sets of two internal state vectors as inputs and a target output comprising an indication of whether the internal state vectors are similar or not. In some embodiments, the target output is binary, and, in other embodiments, the target output is a real valued measure of similarity. After training, the classifier may be used to identify the closest matches to a search input vector. The search input vector is compared to one or more of the stored internal state vectors by using the classifier to output a similarity value. The audio associated with the most similar or set of most similar stored internal state representations is returned as the result of the search. In addition, a blended similarity model may be used that combined mathematical similarity between internal state representations and classifier-based similarity.

The technique of generating internal state representations of a neural network based on sampling the outputs of neural network nodes for use in classification, search, or other applications, as described above, may be used in a variety of machine learning applications and is not limited to use for the application of speech recognition.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A speech recognition system, comprising:
a processor;

a memory, the memory comprising instructions for an end-to-end speech recognition neural network comprising:
a convolutional neural network configured to receive acoustic features of an utterance and output a first representation of the utterance;
a first fully-connected neural network configured to receive a first portion of the first representation of the utterance and a plurality of copies of the first fully-connected neural network for receiving additional portions of the first representation of the utterance, wherein the first fully-connected neural network and the copies are in the same layer, share identical parameters for node weights, and are configured to collectively output a second representation of the utterance;
a recurrent neural network configured to receive the second representation of the utterance from the fully-connected neural network and output a third representation of the utterance;
a second fully-connected neural network configured to receive the third representation of the utterance and output a fourth representation of the utterance, wherein the fourth representation of the utterance comprises a word embedding;
an output neural network configured to receive the fourth representation of the utterance from the second fully-connected neural network and output an indication of one or more words corresponding to the utterance;
wherein the output neural network comprises an output node for each word of a vocabulary, each output node configured to output a probability that the corresponding word is a correct transcription of the utterance, and the output neural network produces a probability distribution over the output nodes for the correct transcription of the utterance;
wherein only the output nodes of the output neural network are associated with words of the vocabulary;
wherein the end-to-end speech recognition neural network directly transcribes the utterance to a word without transcribing the utterance to characters and without transcribing the utterance to phonemes;
wherein the end-to-end speech recognition neural network directly transcribes the utterance to a word using only neural network components and without using any non-neural network components;
wherein the end-to-end speech recognition neural network comprises only neural network layers trained in an end-to-end backpropagation performed through all neural network layers and does not include separately trained components.

2. The speech recognition system of claim 1, wherein the acoustic features received by the convolutional neural network are Mel-Frequency Cepstrum Coefficients (MFCC).

3. The speech recognition system of claim 1, wherein the acoustic features received by the convolutional neural network are spectrograms.

4. The speech recognition system of claim 1, wherein the first, second, third, and fourth representations of the utterance are tensors.

5. The speech recognition system of claim 1, wherein the convolutional neural network comprises a plurality of convolutional neural network layers.

6. The speech recognition system of claim 1, wherein the recurrent neural network comprises a plurality of recurrent neural network layers.

7. The speech recognition system of claim 1, wherein the convolutional neural network, the first fully-connected neural network, the recurrent neural network, the second fully-connected neural network, and the output neural network have been jointly trained in an end-to-end training process to determine their respective trained node weights.

8. A method for speech recognition, comprising:
providing an end-to-end speech recognition neural network comprising a convolutional neural network, a first fully-connected neural network, a recurrent neural network, a second fully-connected neural network, and an output neural network;
receiving, by the convolutional neural network, acoustic features of an utterance;
outputting, by the convolutional neural network, a first representation of the utterance;
receiving, by the first fully-connected neural network and a plurality of copies of the first fully-connected neural network, the first representation of the utterance from the convolutional neural network wherein the first fully-connected neural network receives a first portion of the first representation of the utterance and the plurality of copies of the first fully-connected neural network receive additional portions of the first representation of the utterance, the first fully-connected neural network and the copies being in the same layer and sharing identical parameters for node weights;
collectively outputting, by the first fully-connected neural network and the plurality of copies of the first fully-connected neural network, a second representation of the utterance;
receiving, by the recurrent network, the second representation of the utterance from the first fully-connected neural network;
outputting, by the recurrent neural network, a third representation of the utterance;
receiving, by the second fully-connected neural network, the third representation of the utterance from the recurrent neural network;
outputting, by the second fully-connected neural network, a fourth representation of the utterance, wherein the fourth representation of the utterance comprises a word embedding;
receiving, by the output neural network, the fourth representation of the utterance from the second densely connected neural network;
outputting, by the output neural network, an indication of one or more words corresponding to the utterances;
wherein the output neural network comprises an output node for each word of a vocabulary, each output node configured to output a probability that the corresponding word is a correct transcription of the utterance, and the output neural network produces a probability distribution over the output nodes for the correct transcription of the utterance;
wherein only the output nodes of the output neural network are associated with words of the vocabulary;
wherein the end-to-end speech recognition neural network directly transcribes the utterance to a word without transcribing the utterance to characters and without transcribing the utterance to phonemes;
wherein the end-to-end speech recognition neural network directly transcribes the utterance to a word using only neural network components and without using any non-neural network components;
wherein the end-to-end speech recognition neural network comprises only neural network layers trained in an end-to-end backpropagation performed through all neural network layers and does not include separately trained components.

9. The method of claim 8, wherein the output neural network includes an output node for each word in a vocabulary, and the indication of one or more words corresponding to the utterance is a probability of each word in the vocabulary corresponding to the utterance.

10. The method of claim 8, wherein a dimensionality of the first representation of the utterance is different than a dimensionality of the second representation of the utterance.

11. The method of claim 8, wherein a dimensionality of the third representation of the utterance is different than a dimensionality of the fourth representation of the utterance.

12. The method of claim 8, wherein each of the convolutional neural network, the first fully-connected neural network, the recurrent neural network, the second fully-connected neural network, and the output neural network comprise one or more neural network stacks.

13. The method of claim 8, wherein the convolutional neural network includes one or more pooling stacks, the one or more pooling stacks pooling in both frequency and time dimensions.

14. The method of claim 8, wherein the convolutional neural network, the first fully-connected neural network, the recurrent neural network, the second fully-connected neural network, and the output neural network have been jointly trained in an end-to-end training process to determine their respective trained node weights.

15. A non-transitory computer-readable medium containing instructions for a speech recognition system, the non-transitory computer-readable medium comprising instructions for an end-to-end speech recognition neural network, the instructions comprising:
 a convolutional neural network configured to process a first representation of an utterance to produce a second representation of the utterance;
 a first fully-connected neural network for processing a first portion of the second representation of the utterance and a plurality of copies of the first fully-connected neural network for processing additional portions of the second representation of the utterance, wherein the first fully-connected neural network and the copies are in the same layer, share identical parameters for node weights, and are configured to collectively output a processed second representation of the utterance;
 a recurrent neural network configured to receive the processed second representation of the utterance and produce a third representation of the utterance;
 a second fully-connected neural network for processing the third representation of the utterance;
 an output neural network configured to receive the processed third representation of the utterance, the processed third representation of the utterance comprising a word embedding, and output an indication of one or more words corresponding to the utterance;
 wherein the output neural network comprises an output node for each word of a vocabulary, each output node configured to output a probability that the corresponding word is a correct transcription of the utterance, and the output neural network produces a probability distribution over the output nodes for the correct transcription of the utterance;
 wherein only the output nodes of the output neural network are associated with words of the vocabulary;
 wherein the end-to-end speech recognition neural network directly transcribes the utterance to a word without transcribing the utterance to characters and without transcribing the utterance to phonemes;
 wherein the end-to-end speech recognition neural network directly transcribes the utterance to a word using only neural network components and without using any non-neural network components;
 wherein the end-to-end speech recognition neural network comprises only neural network layers trained in an end-to-end backpropagation performed through all neural network layers and does not include separately trained components.

16. The non-transitory computer-readable medium of claim 15, wherein the output neural network further comprises an output node corresponding a null character.

17. The non-transitory computer-readable medium of claim 15, wherein the convolutional neural network, the recurrent neural network, and the output neural network have been trained by backpropagation from the output neural network through the recurrent neural network and convolutional neural network.

18. The non-transitory computer-readable medium of claim 15, wherein the convolutional neural network, the recurrent neural network, and the output neural network have been jointly trained in an end-to-end training process to determine their respective trained node weights.

19. The non-transitory computer-readable medium of claim 18, wherein the end-to-end training process includes backpropagation from the output neural network through the recurrent neural network and convolutional neural network.

20. The non-transitory computer-readable medium of claim 19, wherein the recurrent neural network is bidirectional.

* * * * *